(12) United States Patent
Kang et al.

(10) Patent No.: US 6,404,802 B1
(45) Date of Patent: Jun. 11, 2002

(54) FLEXIBLE BINARY PHASE SHIFT KEYING/ QUADRATURE PHASE SHIFT KEYING MODULATOR OF WIDEBAND CODE DIVISION MULTIPLE ACCESS SYSTEM

(75) Inventors: Se-jin Kang; Sung-soo Dong, both of Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/396,272

(22) Filed: Sep. 15, 1999

(30) Foreign Application Priority Data

Sep. 22, 1998 (KR) .............................................. 98-39294

(51) Int. Cl.[7] .......................... H04R 1/707; H04L 27/30; A61F 2/06
(52) U.S. Cl. ........................................ 375/146; 375/295
(58) Field of Search ................................ 375/130, 141, 375/146, 295–308, 309; 370/335, 342, 441, 480

(56) References Cited

U.S. PATENT DOCUMENTS

| 5,488,629 A | | 1/1996 | Takahasi et al. |
| 5,511,073 A | * | 4/1996 | Padovani et al. ........... 370/471 |
| 5,610,939 A | | 3/1997 | Takahasi et al. |
| 5,677,930 A | | 10/1997 | Bottomley |
| 5,751,705 A | * | 5/1998 | Sato ............................ 327/180 |
| 5,751,761 A | * | 5/1998 | Gilhousen .................... 370/209 |
| 5,771,228 A | | 6/1998 | Dent et al. |
| 5,862,173 A | | 1/1999 | Dent et al. |
| 5,881,099 A | | 3/1999 | Takahashi et al. |
| 6,097,715 A | * | 8/2000 | Ichihara ....................... 370/342 |
| 6,269,113 B1 | * | 7/2001 | Park ............................ 370/335 |

* cited by examiner

Primary Examiner—Stephen Chin
Assistant Examiner—Lenny Jiang
(74) Attorney, Agent, or Firm—Klauber & Jackson

(57) ABSTRACT

A flexible BPSK (binary phase shift keying)/QPSK (quadrature phase shift keying) modulator of the wideband code division multiple access system. The flexible modulator includes a first link selecting unit for selecting a modulating type after receiving a signal of a reverse channel, alternately, an I (In-phase) signal and Q (quadrature) signal of a forward channel for which a spread modulation is to execute, a Hadamard spreading unit permits Hadamard code spreading modulation after receiving the I and Q signals from the first link selecting unit, and a spreading means for executing a spread modulation for a pseudo-noise (PN) code of the exchanged I and Q signals. The present invention can reduce the amount of hardware required by controlling a similar parts of the channel in a wideband code division multiple access system, especially a BPSK/QPSK modulation parts, by an external register and a flexible channel structure for joint control between channels. A reduced number of gates, and reduced power consumption, as well as reliability can be increased by the flexible modulator.

16 Claims, 18 Drawing Sheets

FLEXIBLE BINARY PHASE SHIFT KEYING/ QUADRATURE PHASE SHIFT KEYING MODULATOR OF WIDEBAND CODE DIVISION MULTIPLE ACCESS SYSTEM

CLAIM OF PRIORITY

This application makes reference to, incorporates the same herein, and claims all benefits accruing under 35 U.S.C. §119 arising from an application entitled, A FLEXIBLE BINARY PHASE SHIFT KEYING/QUADRATURE PHASE SHIFT KEYING MODULATOR OF WIDEBAND CDMA SYSTEM, earlier filed in the Korean Industrial Property Office on Sep. 22, 1998, and there duly assigned Serial No. 1998-39294.

FIELD OF THE INVENTION

The present invention relates to a flexible modulator for binary phase shift keying/quadrature phase shift keying for a wide-band code division multiple access system. More specifically, the present invention relates to a flexible modulator for use in a binary phase shift keying (BPSK) method and a quadrature phase shift keying (QPSK) method for a wide-band code division multiple access system.

DESCRIPTION OF THE RELATED ART

In a code division multiple access system, each signal of each subscriber has a common frequency transmitted by a frequency after multiplying by their own code, and spreading in a spectrum. In the case of a received signal, such a received signal is identified by reverse spreading and multiplying by their own codes, which is identical to the case of transmitting.

In the code division multiple access system, it is possible to increase the efficiency of frequency allocation by using a spreading spectrum and executing coding by multi-keying by their code.

Generally, the frequency spreading process decreases noise and an interference of the signal, but increases the required bandwidth. However, in the code division multiple access system, it is possible to accommodate a plurality of subscribers to one frequency by using a code, therefore an increase of the bandwidth due to spreading does not pose a significant drawback.

In the code division multiple access system, a channel which is used for transmission from a base station to a radio terminal is called a forward link, and a reverse channel is from the radio terminal to the base station is called a reverse link.

Typically, in the code division multiple access system, an interval between channels (channel spacing) is 5 Mhz. The bit error for transmission can be decreased by using a convolutional encoder, and an essential orthogonal code is allocated to each channel for identifying the forward link.

In the code division multiple access system, when direct sequence spreading is used, a chip rate is 4.096 Mega chip per second (Mcps), and each channel is modulated by a QPSK process after executing a BPSK process. But, the channel spacing is extended with a lager spreading rates.

A reverse channel comprises an access channel and a reverse traffic channel, and each channel has a reverse pilot channel. A mobile terminal transmits a reverse pilot channel synchronized with a pilot signal received from a base station. The reverse traffic channel also comprises a reverse information channel and a reverse signaling channel. These channels own jointly a CDMA frequency allocated by using a direct sequence—code division multiple access (DS-CDMA) technology. Each access channel and its reverse traffic channel is identified by an essential long code sequence of the subscriber.

FIGS. 1a and 1b illustrate a structure of a conventional access channel of a wideband CDMA system. A reverse link sequence 101(110) and a Hadamard code 102(111) have a same pseudo-noise chip rate (Rc). As shown in FIG. 1b, a modulation symbol rate input to reverse link sequence 110 is 64 ksps, 128 ksps, and 256 ksps for a system having a bandwidth of 3.5/5 MHz, 7/10/10.5 MHz, and 14/15 Mhz, respectively. A code rate (r) of a convolutional encoder 107 is 1/2, and a constraint length (k) is 7 or 9.

An access channel comprises a reverse pilot channel and a reverse access channel. The reverse pilot channel is used for determining the phase references of the reverse channel, an acquired channel, and a track channel in a base station.

FIGS. 1a and 1b show the reverse pilot signal s(t) 105 (114) comprises a non-modulated long code sequence. FIG. 1a shows a pilot channel composed of zeros is converted by a reverse link sequence 101, and then divided into an in-phase signal (I) and a quadrature signal (Q). Each divided signal (I and Q) is spread out by using a Hadamard code $H_0$ and $H_1$ 102, respectively, and passed by a baseband filter 103, and multiplied by $\cos(2pf_c t)$ and $\sin(2pf_c t)$ 104, respectively. Finally, after summing together the two multiplied I and Q signals 105 together, the composite signal s(t) 105 is output for transmitting.

FIG. 1b illustrates the structure of a reverse access channel. An information bit of the reverse access channel is 154 bits per frame (or 152 bits per frame) while the constraint length k is 9.

The information bit of the access channel generated with 7.7 (or 7.6) kbps is added by 6 (or 8) bits for encoding at adder 106, and is then output to a convolutional encoder 107 at a speed of 8 kbps.

The convolutional encoder 107 constantly maintains a symbol rate of 16 kilo symbols per second (ksps) by iterating input bits as the occasion demands for error correction.

A block interleaver 108 writes a code symbol received from the convolutional encoder with a unit of columns, and reads with a unit of rows.

A symbol repeater 109 iterates each block interleaved symbol as required for an access channel having a fixed data rate, and the iterated signal is constantly maintained with a speed of a modulation symbol rate.

The iterated signal is converted by a reverse link sequence 110, and then is divided into an in-phase signal (I) and a quadrature signal (Q).

Each divided signal (I and Q) is spread out by using a Hadamard code $H_0$ and $H_1$ respectively 111, passed by a baseband filter 112, multiplied by one of $\cos(2pf_c t)$ and $\sin(2pf_c t)$ 113, respectively. Finally the two multiplied I and Q signals are summed together and output as a composite signal s(t) 114 for transmission.

FIGS. 2a and 2b illustrate a reverse traffic channel structure with a single signal mode in a conventional wideband code division multiple access system. The reverse traffic channel operates at four kinds of variable data rates, and a reverse information channel operates at 16, 32 and 64 kbps. A signaling channel operates at 2 and 4 kbps.

FIG. 2a illustrates the structure of a reverse pilot power control signaling (PPCS) channel. The pilot information (all zeros), power control information, redundant information bit, and a signaling channel information are all modulated.

The pilot channel bit, which is composed of zeros, is directly transferred to multiplexer 201. The power control information bit, which has 10 bits per frame, is transferred to the multiplexer 201 via a quadruple symbol repeater 202.

The signaling channel information bit having 74 bits (or 72) bits per frame is added with a predetermined number of bits (e.g. 6 or 8 bits) for encoding, then is encoded convolutionally by encoder 204; the information output from encoder 204 is block interleaved 205, iterated by a symbol repeater 206, and subsequently transferred to multiplexer 201.

The multiplexer 201 generates a spread symbol with 16 ksps after a time division multiplexing bits of a pilot channel with 4 ksps, a power control information channel with 2 ksps, and a redundant information channel with 2 ksps, and a signaling channel information channel with 8 ksps.

The generated spread symbol is transferred to a symbol post-repeater 207. The iterated signal by the symbol post-repeater 207 is converted by a reverse link sequence 208 and then divided into an in-phase signal (I) and a quadrature signal (Q).

Each divided signal (I and Q) is spread out by using a Hadamard code $H_0$ and $H_1$ respectively 209, passed by a baseband filter 210, and multiplied by one of $\cos(2pf_c t)$ and $\sin(2pf_c t)$ 211, respectively. Finally, the multiplied I and Q signals are summed together and the composite signal is output as signal s(t) for transmission.

FIG. 2b illustrates the structure of a reverse information traffic channel. A reverse traffic channel information bit is output from convolutional encoder 213 to symbol puncturing means 214 for clearing certain symbols necessary for an agreement of the data rates.

A signal, which is input to the symbol puncturing means 214, is then output to a serial to parallel converter 216 via a symbol pre-repeater 215. The serial to parallel converter 216 receives a BPSK data from the symbol pre-repeater 215 and supplies two parallel binary data stream I and Q signals.

The parallel converted I and Q signals are iterated in a symbol post-repeater 217 and converted to QPSK data.

The QPSK converted I and Q signals are converted by a reverse link sequence 218, and then spread out by using a Hadamard code $H_2$ and $H_3$ 219, respectively, and passed by a baseband filter 220, and multiplied by one of $\cos(2pf_c t)$ and $\sin(2pf_c t)$ 211, respectively. Finally, after summing the two multiplied I and Q signals together, the composite signal is output as signal s(t) 222 for transmission.

FIG. 3a through FIG. 3c illustrates a reverse traffic channel structure with a multiple signal mode in a conventional wideband code division multiple access system. In FIG. 3a, symbol repeater 302, adder 303, convolutional encoder 304, block interleaver 305, symbol repeater 306, symbol post repeater 307, reverse link sequence 308, Hadamard spreading unit 309, baseband filter 310, multiplier 311, and output signal 312 all operate as discussed in FIG. 2a. A reverse traffic channel is added to the reverse traffic channel structure with a multiple signal mode.

As illustrated in the FIGS. 3b and 3c, a nth (and mth) reverse traffic channel executes convolutional encoding at 313 (323) of n (and m) information bits of the reverse traffic channel, symbol puncturing 314 (324), and symbol pre-iteration 315 (325), serial to parallel conversion 316 (326), and symbol post-iteration 317 (327).

The symbol post-iterated I and Q signals are converted by a reverse link sequence 318. The I signal is spread out by using a Hadamard code $H_{2n}$ and the Q signal is spread out by using a Hadamard code $H_{2n+1}$ or $H_{2n+1}$ 319 (329).

The I and Q signals are output to baseband filter 320 (330), and multiplied by one of $\cos(2pf_c t)$ and $\sin(2pf_c t)$ 321 (331), respectively. Finally, after summing the two multiplied I and Q singals together, a composite signal s(t) 322 (332) is output for transmission.

FIG. 4a and FIG. 4b illustrates a structure of a packet access channel in a wideband code division multiple access system. The operation of the pilot channel of the FIG. 4a is same to the FIG. 1a, whereby a pilot signal comprised of all zeros is converted by reverse link sequence 401, and subsequently divided into an in-phase signal (I) and a quadrature signal (Q). Hadamard encoding unit 402, baseband filter 403, multiplier 404, and the summing of the multiplied signals as composite signal s(t) 405 all operate as previously indicated in the discussion of FIG. 1a.

As illustrated in the FIG. 4b, an information bit of the packet access channel with 34 (or 32) bits per frame is added with 6 (or 8)a bits for encoding at adder 406, and is subsequently convolutionally encoded 407, block interleaved 408, and iterated at symbol repeater 409. Finally, a spreading sequence is performed by a reverse link sequence 410 and a Hadamard coding unit 411, baseband filter 412, multiplier 413, and output for transmission as composite signal 414.

FIG. 5a and FIG. 5b illustrate a structure of a reverse packet traffic channel in a wideband code division multiple access system. A packet signaling channel information bit is added with 6 (or 8) bits for encoding at adder 502, convolutionally encoded at encoder 503, block interleaved at unit 504, iterated by symbol repeater 505, and output to multiplexer 501.

The multiplexer generates 501 a spread symbol by executing a time divisional multiplexing a non-modulated signal of the pilot channel and a symbol iterated signal of the packet signaling channel.

The spread symbol is iterated again by symbol post-repeater 506 and is spread by a reverse link sequence 507 and a Hadamard code 508. The baseband filter 509, multiplier 510, and composite output signal s(t) 511 are the same as previously described in the discussion of FIG. 4b.

As illustrated in FIG. 5b, an information bit of the reverse packet traffic channel is input for convolutional encoding 512, and then is subsequently block interleaved 513. The block interleaved signal is subsequently input to symbol repeater, converted to parallel from serial 515, and converted to QPSK. Finally, a spreading by reverse link sequence 517 and a Hadamard coding unit to the I and Q signals 518. The baseband filter 519, multiplier 520, and the output composite signal s(t) are the same as previously described in the discussion of FIG. 4b.

A forward wideband code division multiple access channel comprises a pilot channel, a synchronous channel, and paging channels more than 8, and numbers of forward traffic channels.

The forward traffic channel comprises a forward information channel and a forward signaling channel.

Each code channel is executed using orthogonal spreading by an appropriate Walsh code and is executed second spreading with a chip rate of 4.096 Mcps by a pseudo-noise sequence.

The forward pilot channel, the signaling channel and a power control channel and a spare information channel are identified each other by a forward power control signaling (PCS) channel.

Hereinafter, an embodiment of the conventional forward wideband CDMA channel is illustrated. A forward link sequence and a Hadamard code have a same pseudo-noise chip rate (Rc) and a modulation symbol rate is 64 ksps, 128 ksps for a system having a bandwidth of 3.5/5 MHz, 7/10/10.5 MHz, respectively. A code rate (r) of a convolutional encoder is 1/2, and a constraint length (k) is 7 or 9.

FIG. 6a through FIG. 6e illustrate a structure of a forward channel in a conventional wideband code division multiple access system.

FIG. 6a illustrates a channel structure of a forward pilot channel and a synchronous channel. The pilot channel that is a non-modulated spread spectrum signal is transmitted by an activated base station and used for tuning a radio terminal activated in a coverage area of a base station.

As shown in FIG. 6a, the pilot channel composed of zeros is spread out by using a Hadamard coding unit $H_0$ 601 and then divided into an in-phase signal (I) and a quadrature signal (Q).

The divided signal I is spread out by a forward link I channel sequence 602 and multiplied at multiplier 604 by $\cos(2pf_c t)$ via a baseband filter 603.

The divided signal Q is spread out by a forward link Q channel sequence 602 and multiplied at multiplier 604 by $\sin(2pf_c t)$ via the baseband filter 603. Finally, after adding the two multiplied I and Q signals, a composite signal s(t) 605 is output for transmission.

A bit rate for the forward synchronous channel is 16 kbps. And, for a same base station, a pilot pseudo-noise sequence of I and Q channel for the forward synchronous channel is same to the pilot pseudo-noise sequence offset of a pilot channel.

Accordingly, the synchronicity of a synchronous channel can be found by searching a pilot channel and taking a pilot pseudo-noise sequence.

As shown in FIG. 6a, the forward synchronous channel bit is added by 6 or 8 bits by adder 606 for encoding, convolutionally encoded at encoder 607, block interleaved at block interleaver 608, converted from serial to parallel at converter 609, subsequently converted to QPSK by executing a symbol post repeater 610, and is spread out by a Hadamard coding unit $H_1$ 611.

The spread I and Q signals are spread out by a forward link I channel sequence and a forward link Q channel sequence 612, respectively, are multiplied by multiplier 614 by $\cos(2pf_c t)$ and $\sin(2pf_c t)$, respectively, after being output from the baseband filter 613. Finally, after summing together the two multiplied I and Q signals, a composite signal s(t) 615 is output for transmission.

A forward paging channel transmits an information at 16 kbps data rates.

A frame of the paging channel is held for 5 ms. The paging channel has a paging channel slot with a size of 20 ms.

In one base station, the paging channel and the pilot channel use a same pilot pseudo-noise sequence.

As shown in FIG. 6b, the forward paging channel bit is added with 6 or 8 bits by adder 616b for encoding, is convolutional encoded at encoder 617, block interleaved at block interleaver 618, and converted from serial to parallel at converter 619, converted to QPSK by executing a symbol post repeater (620), and is spread out by a Hadamard code $H_m$ at Hadamard coding unit 621, where m is a value between 2 through 5 (621).

The spread I and Q signals are spread out by a forward link I channel sequence and a forward link Q channel sequence 622, respectively, multiplied at multiplier 621 by one of by $\cos(2pf_c t)$ and $\sin(2pf_c t)$, respectively, after being output from baseband filter 623. Finally, after summing together the two multiplied I and Q signals, a composite signal s(t) 625 is output for transmission.

During call service, the forward traffic channel is used for transmitting and signaling information to a specific radio terminal.

For the forward traffic channel, a base station transmits information with variable data rates of 64, 32 and 16 kbps, holds a constant speed of 64 kbps by a symbol puncturing means.

A channel frame of the forward traffic channel has an interval of 5 ms and a pilot pseudo-noise sequence and a pilot pseudo-noise sequence offset, which is the same for the pilot channel of a same base station.

The forward traffic channel uses data scrambling and a pseudo-noise sequence having a long period. The pseudo-noise sequence is allocated to each subscriber and has a period of $2^{42}$ B1 chips.

As shown in FIG. 6c, the forward traffic channel bit is convolutionally encoded at encoder 626, and is held by symbol puncturing means 627. A scramble code generator 628 generates scrambling codes by using the scrambling code seed supplied for a traffic channel n.

The punctured symbol is added to the scrambling code at 629. The scrambling code having the punctured symbol is converted from serial to parallel at converter 630, converted to QPSK by symbol repeater 631, and is spread out by a Hadarnard coding unit $H_n$ 632.

The spread I and Q signals are spread out by a forward link I channel sequence and a forward link Q channel sequence respectively 633, are multiplied by multiplier 632 by one of $\cos(2pf_c t)$ and $\sin(2pf_c t)$, respectively, being output from baseband filter 634. Finally, after summing the two multiplied I and Q signals, a composite signal s(t) 636 is output for transmission.

FIG. 6d illustrates a channel structure of the forward signaling information channel and power controlling/spare information channel.

As shown FIG. 6d, an information bit of the forward signaling channel is added with 6 or 8 bits for encoding by adder 637, is convolutionally encoded at encoding unit 638, is block interleaved at block interleaver 639, and is repeated by symbol repeater 640.

The power controlling/spare information symbol executes a symbol iteration at symbol repeater (4×) 646 for making the symbol rates identical to the forward signaling channel. An additional a symbol iteration from symbol repeater (4×) 646 to symbol repeater 640 is performed for making the symbol rates identical to modulation symbol rates output by symbol repeater 647.

The iterated signaling information bit and the power controlling/spare information symbol is spread out by a Hadamard code $H_k$ (641).

The spread iterated signaling information bit and the power controlling/spare information symbol are spread out by a forward link I channel sequence and a forward link Q channel sequence respectively 642, multiplied at multiplier 644 by one of $\cos(2pf_c t)$ and $\sin(2pf_c t)$, respectively, after being output from baseband filter 643. Finally, after summing the two multiplied I and Q signals together, a composite signal s(t) 645 is output for transmission.

The signaling information bit and the power controlling/spare information symbol spread out by the Hadamard code can be exchanged with each other is required in accordance with call service by subscribers.

FIG. 6e illustrates a channel structure of the forward packet traffic channel. The forward packet traffic channel bit is convolutionally encoded at encoder 646, is block interleaved at block interleaver 647, added with a scrambling code 648 generated by the scrambling code generator at adder 649.

The scrambled signal is converted from serial to parallel at converter 650, and is converted to QPSK by symbol repeater 651, and is spread out by a Hadamard coding unit $H_p$ 652.

The spread I and Q signals are spread out by a forward link I channel sequence and a forward link Q channel sequence 653, respectively, multiplied at multiplier 655 by one of $\cos(2pf_ct)$ and $\sin(2pf_ct)$, respectively, after being output from baseband filter 654. Finally, after summing the two multiplied I and Q signals, a composite signal s(t) 656 is output for transmission.

As illustrated in the above figures, the internal blocks of each channel in the conventional wideband code division multiple access channel have blocks performing similar functions between the channels.

However, there are some parts for holding commonality between a forward channel and a reverse channel.

But, since the above channels are constructed by an independent hardware, especially ASIC (Application Specific Integrated Circuit), a large number of gates are needed to perform redundant functions.

This large number of gates has causes a problem of decreasing the ASIC reliability and increasing the power consumption.

SUMMARY OF THE INVENTION

It is an object of the present invention for solving the above problems of decreased reliability and increased power consumption by providing a flexible modulator as a means for controlling a similar parts of a wideband code division multiple access (W-CDMA) channel by an external register which permits the flexible modulator for executing a binary phase shift keying (BPSK) and a quadrature phase shift keying (QPSK) capable of controlling common channels.

According to the present invention, a preferred embodiment of a flexible modulator for binary phase shift keying and quadrature phase shift keying in a wideband code division multiple access system comprises:

a first link selecting means for selecting a modulating type after receiving a signal of a reverse channel or an I (In-phase) signal and Q (quadrature) signal of a forward channel for which a spread modulation is to execute;

Hadamard spreading means for a Hadamard code spreading modulation after receiving said I and Q signals from the first link selecting means;

exchanging means for exchanging signal paths of the Hadamard spread I and Q signals when an exchange for the forward signal is needed; and, spreading means for executing a spread modulation for a pseudo-noise (PN) code of the exchanged I and Q signals.

In the above embodiment, it is preferable that the first link selecting means receives a signal to be spread out of a reverse pilot power control signaling (PPCS) channel.

It is also preferable that the first link selecting means receives said I and Q signals to be spread out of a forward power control signaling (PCS) channel.

It is also preferable that the first link selecting means comprises:

an I multiplexer for selecting a reverse I signal when a channel operating mode is a reverse channel mode and for selecting a forward I signal when the channel operating mode is a forward channel mode;

a Q multiplexer for selecting a reverse I signal when a channel operating mode is a reverse channel mode and for selecting a forward Q signal when the channel operating mode is a forward channel mode, and a symbol repeater for executing a symbol iteration for said I signal received from the I multiplexer and said Q signal received from the Q multiplexer.

It is preferable that an iteration rule of the symbol repeater is determined by a channel bandwidth and a type of channels.

It is preferable that the Hadamard spreading means comprises:

an I Hadamard spreader for spreading the reverse or the forward I signal by a first Hadamard code, and a Q Hadamard spreader for spreading the reverse Q signal by a second Hadamard code and the forward Q signal by the first Hadamard code.

It is preferable that the psuedo-noise (PN) code spreading means comprises:

an I psuedo-noise (PN) code spreader for spreading the reverse or forward I signals by a first PN code, and a Q PN spreader for spreading the reverse Q signal by the first PN code and the forward Q signal by a second PN code.

According to the present invention, a second preferred embodiment of a flexible modulator for binary phase shift keying and quadrature phase shift keying in a wideband code division multiple access system comprises:

a first link selecting means for selecting a modulating type after receiving a signal of a reverse channel or an I (In-phase) signal and Q (quadrature) signal of a forward channel for which a spread modulation is to execute;

Hadamard spreading means for a Hadamard code spreading modulation after receiving said I and Q signals from the first link selecting means; and, spread modulation means for executing a spread modulation for a pseudo-noise (PN) code of the Hadamard spread I and Q signals.

In the second embodiment, it is preferable that the first link selecting means is connected to a forward traffic channel signal to be spread out.

In a variation of the second embodiment, it is also preferable that the first link selecting means is connected to a forward synchronous channel signal to be spread out.

It is also preferable that the first link selecting means is connected to a forward paging channel signal to be spread out.

It is also preferable that the first link selecting means is connected to a reverse traffic channel signal to be spread out.

It is preferable that the first link selecting means is connected to a reverse access channel signal to be spread out.

In the second embodiment, It is preferable that the first link selecting means comprises:

a serial to parallel converter for converting the reverse or forward channel signal to be spread out to 2 bits parallel and transferring to the I multiplexer and Q multiplexer respectively;

an I multiplexer for selecting the reverse or forward channel signal to be spread out, if a transfer rates are under the 32 kbps and 80 kbps in 5 Mhz and 10 Mhz bandwidth respectively in a reverse operation mode and selecting an output signal of the serial to parallel converter if not;

a Q multiplexer for selecting the reverse or forward channel signal to be spread out, if a transfer rates are under the 32 kbps and 80 kbps in 5 Mhz and 10 Mhz bandwidth respectively in a reverse operation mode and selecting an output signal of the serial to parallel converter if not; and, a symbol repeater for executing a symbol iteration for the transferred signals from the I multiplexer and Q multiplexer.

It is preferable that the Hadamard spreading means comprises:

an I Hadamard spreader for spreading the reverse or the forward I signal by first Hadamard code, and a Q Hadarnard spreader for spreading the reverse Q signal by the second Hadamard code and the forward Q signal by the first Hadamard code.

It is preferable that the PN code spreading means comprises:

an I PN code spreader for spreading the reverse or forward I signals by the first PN code, and a Q PN spreader for spreading the reverse Q signal by the first PN code and the forward Q signal by the second PN code.

DESCRIPTION OF THE PREFERRED EMBODIMENTS

Figure 1A:
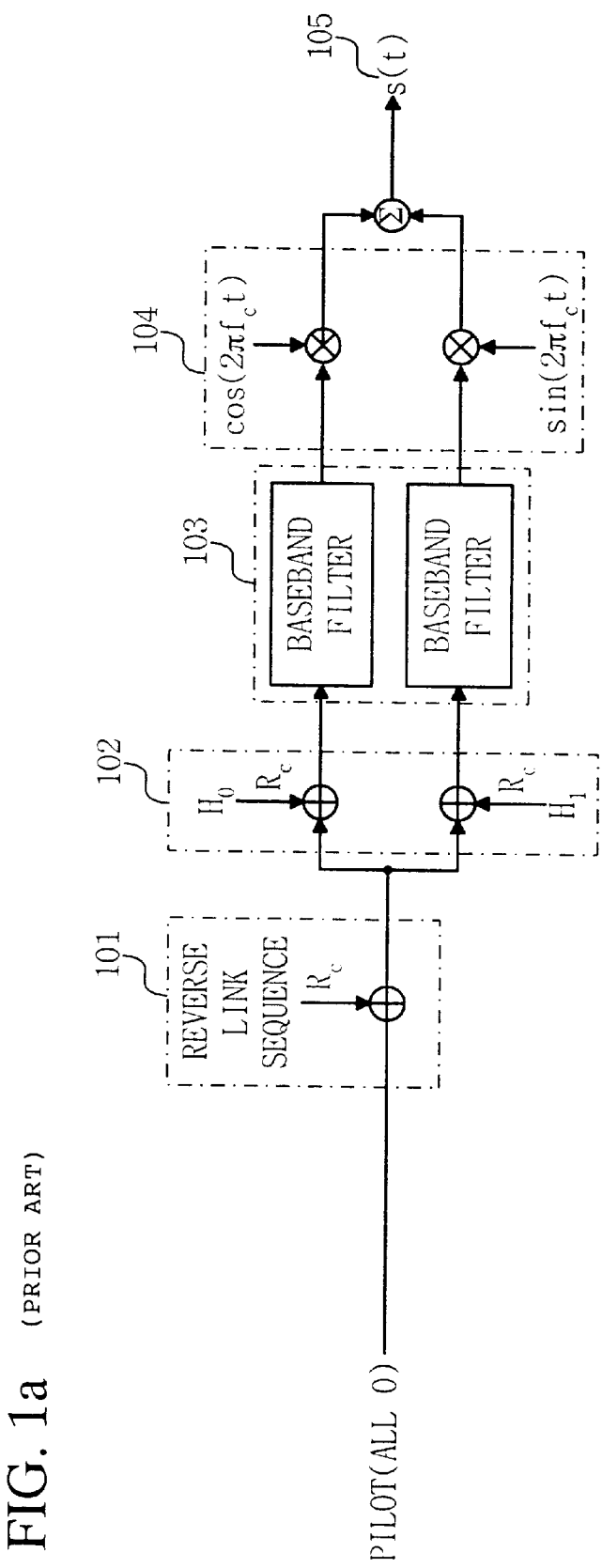
FIGS. 1a and 1b illustrate a channel structure of an access channel in a conventional wideband code division multiple access system.
Figure 1B:
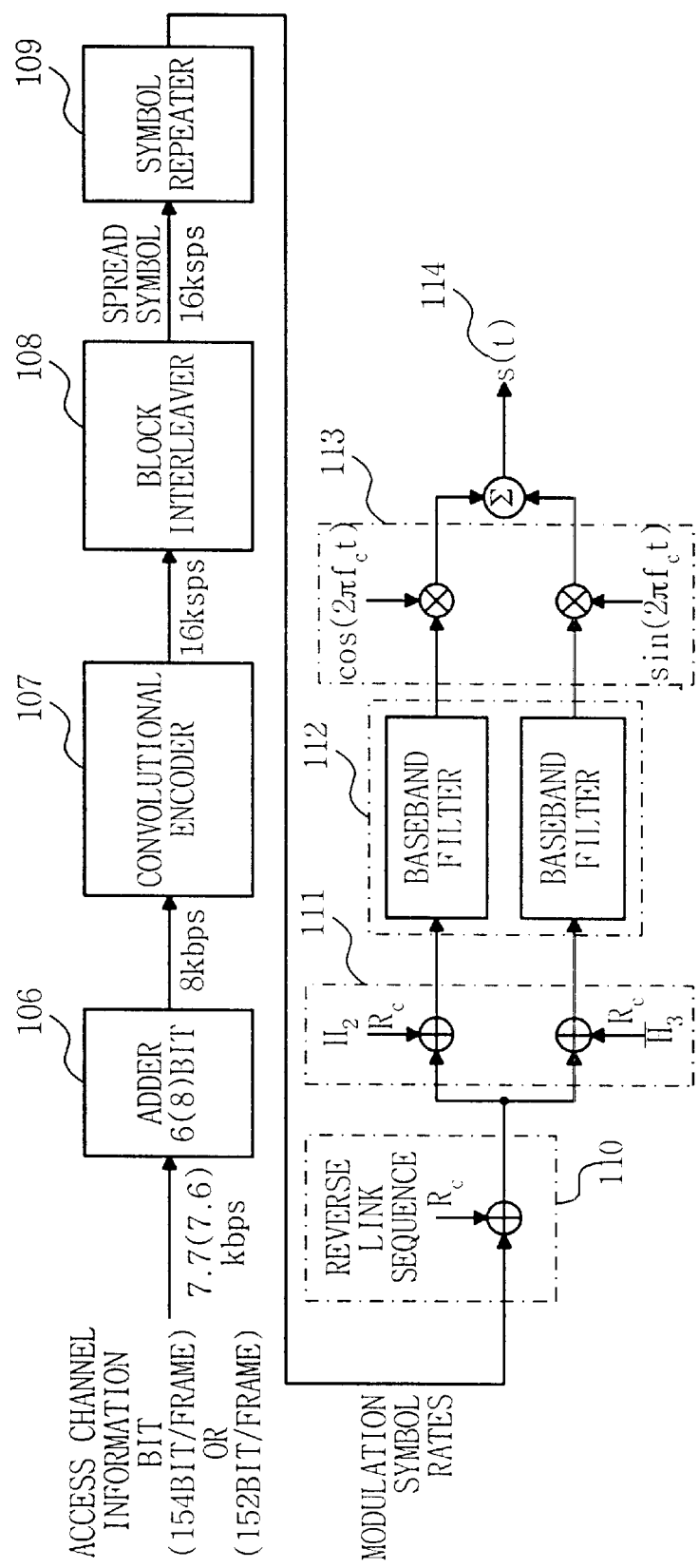

In accordance with one embodiment of the present invention, a flexible modulator for binary phase shift keying and quadrature phase shift keying in a wideband code division multiple access system comprises a first link selecting means for selecting a modulating type after receiving signals to be executed a spread modulation including a signal of a reverse channel or an I (In-phase) signal and Q (quadrature) signal of a forward channel, a Hadamard spreading means for a Hadamard code spreading modulation after receiving said I and Q signals from the first link selecting means, and a spreading means for executing a spread modulation for a pseudo-noise (PN) code of the exchanged I and Q signals.

It is preferable to add an exchanging means for exchanging signal paths of the Hadamard spread I and Q signals when an exchange for the forward signal is needed to the flexible modulator.

It is also preferable the first link selecting means receives a signal to be spread out of a reverse pilot power control signaling (PPCS) channel.

It is also preferable the first link selecting means receives said I and Q signals to be spread out of a forward power control signaling (PCS) channel.

Preferably, the first link selecting means comprises:

an I multiplexer for selecting a reverse I signal when a channel operating mode is a reverse channel mode and for selecting a forward I signal when the channel operating mode is a forward channel mode;

a Q multiplexer for selecting a reverse I signal when a channel operating mode is a reverse channel mode and selecting a forward Q signal when the channel operating mode is a forward channel mode; and, a symbol repeater for executing a symbol iteration for said I signal received from the I multiplexer and said Q signal received from the Q multiplexer.

Preferably, an iteration rule of the symbol repeater is determined by a channel bandwidth and a channel kinds.

Preferably, the Hadamard spreading means comprises:

an I Hadamard spreader for spreading the reverse or the forward I signal by first Hadarnard code, and a Q Hadamard spreader for spreading the reverse Q signal by the second Hadamard code and the forward Q signal by the first Hadamard code.

Preferably, the PN code spreading means comprises:

an I PN code spreader for spreading the reverse or forward I signals by the first PN code, and a Q PN spreader for spreading the reverse Q signal by the first PN code and the forward Q signal by the second PN code.

In accordance with a third embodiment of the present invention, the flexible modulator for binary phase shift keying and quadrature phase shift keying in a wideband code division multiple access system comprises:

a first link selecting means for selecting a modulating method after receiving signals to be executed a spread modulation including a signal of a reverse channel or an I (In-phase) signal and Q (quadrature) signal of a forward channel;

a Hadamard spreading means for a Hadamard code spreading modulation after receiving said I and Q signals from the first link selecting means; and, a spreading means for executing a spread modulation for a pseudo-noise (PN) code of the Hadamard spread I and Q signals.

Preferably, the first link selecting means is connected to a forward traffic channel signal to be spread out.

Preferably, the first link selecting means is connected to a forward synchronous channel signal to be spread out.

Preferably, the first link selecting means is connected to a forward paging channel signal to be spread out.

Preferably, the first link selecting means is connected to a reverse traffic channel signal to be spread out.

Preferably, the first link selecting means is connected to a reverse access channel signal to be spread out.

Preferably, the first link selecting means comprises a serial to parallel converter for converting the reverse or forward channel signal to be spread out to 2 bits parallel and transfering to the I multiplexer and Q multiplexer respectively, an I multiplexer for selecting the reverse or forward channel signal to be spread out, if a transfer rates are under the 32 kbps and 80 kbps in 5 Mhz and 10 Mhz bandwidth respectively in a reverse operation mode and for selecting an output signal of the serial to parallel converter if not, a Q multiplexer for selecting the reverse or forward channel signal to be spread out, if a transfer rates are under the 32 kbps and 80 kbps in 5 Mhz and 10 Mhz bandwidth respectively in a reverse operation mode and selecting an output signal of the serial to parallel converter if not, and a symbol repeater for executing a symbol iteration for the transferred signals from the I multiplexer and Q multiplexer.

The Hadamard spreading means comprises an I Hadamard spreader for spreading the reverse or the forward I signal by first Hadamard code, and a Q Hadamard spreader for spreading the reverse Q signal by the second Hadamard code and the forward Q signal by the first Hadamard code.

Preferably, the PN code spreading means comprises an I PN code spreader for spreading the reverse or forward I signals by the first PN code, and a Q PN spreader for spreading the reverse Q signal by the first PN code and the forward Q signal by the second PN code.

There are internal blocks for executing similar functions in each other's channels of the wideband code division multiple access system, and there are common parts between a forward channel and a reverse channel.

The present invention controls those common parts, especially a BPSK/QPSK modulation parts, by an external register and provides a flexible channel structure for controlling the hardware in common between the channels.

Figure 7:
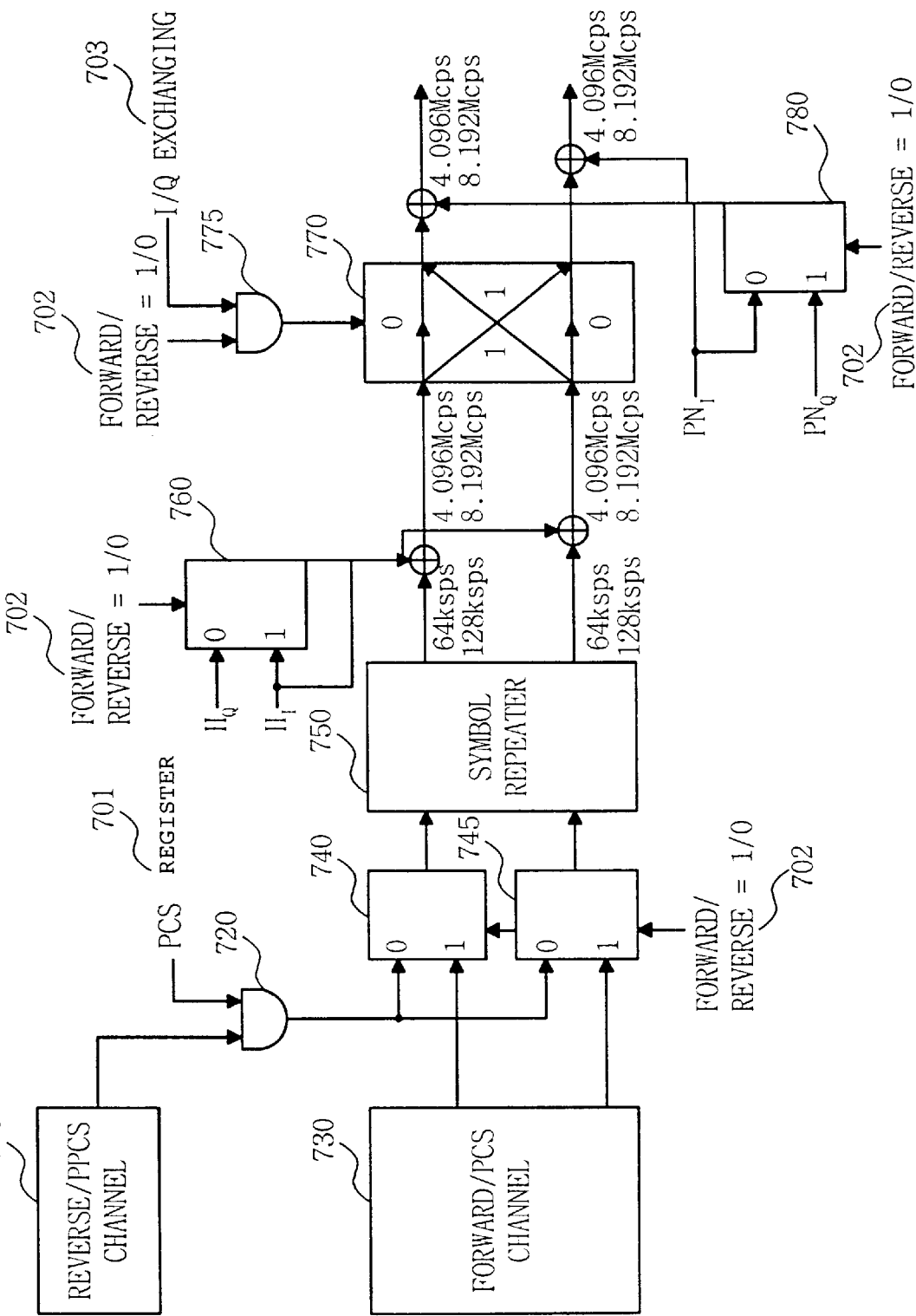
FIG. 7 illustrates a PCS/PPCS channel structure of the present invention.

FIG. 7 illustrates a channel structure of the BPSK/QPSK channel of the present invention. A signal is transferred from a reverse/PPCS channel (710) before executing a spreading in each channel.

Figure 2A:
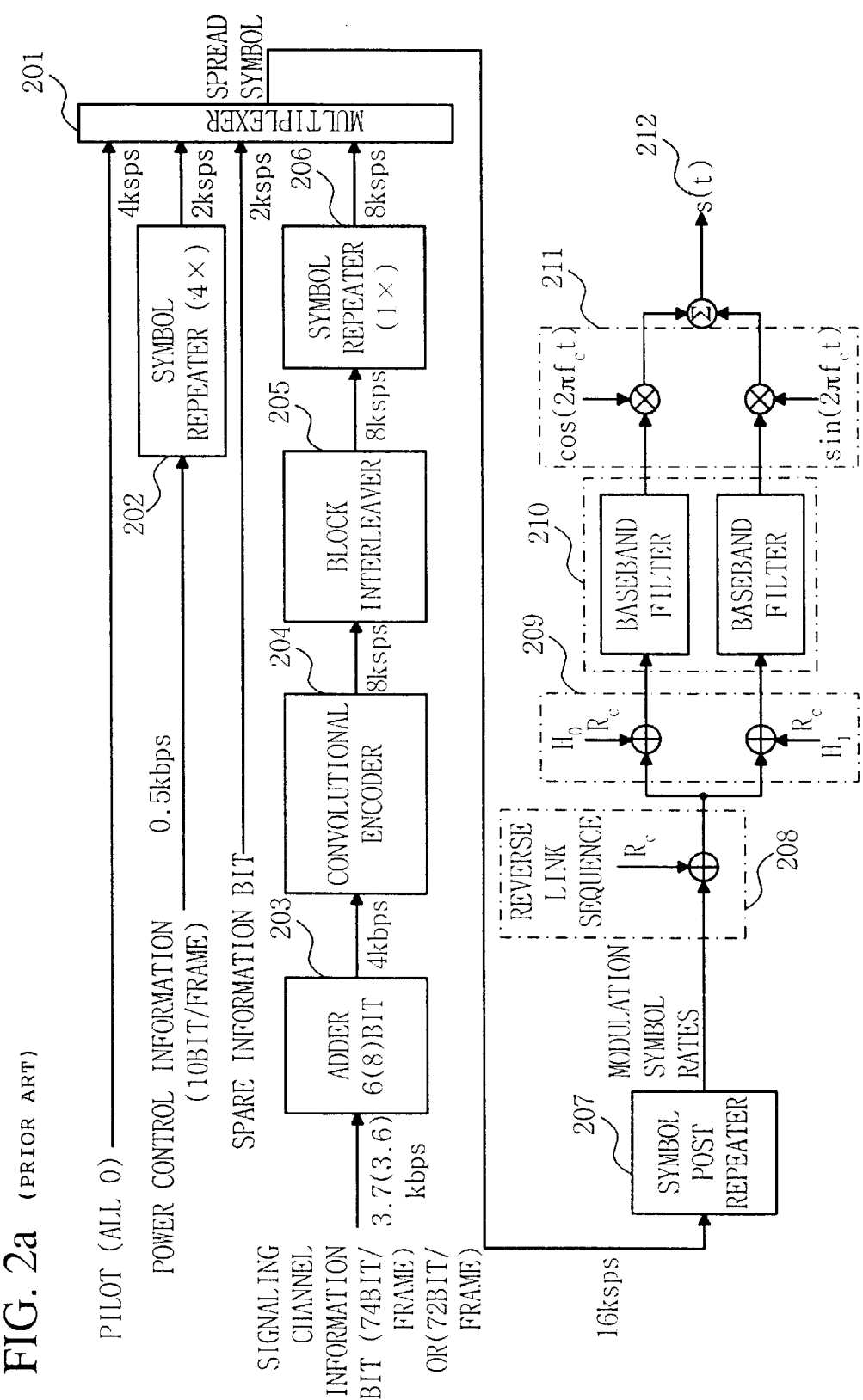
FIGS. 2a and 2b illustrate a channel structure of a reverse traffic channel of a single signal mode in a conventional wideband code division multiple access system.
Figure 2B:
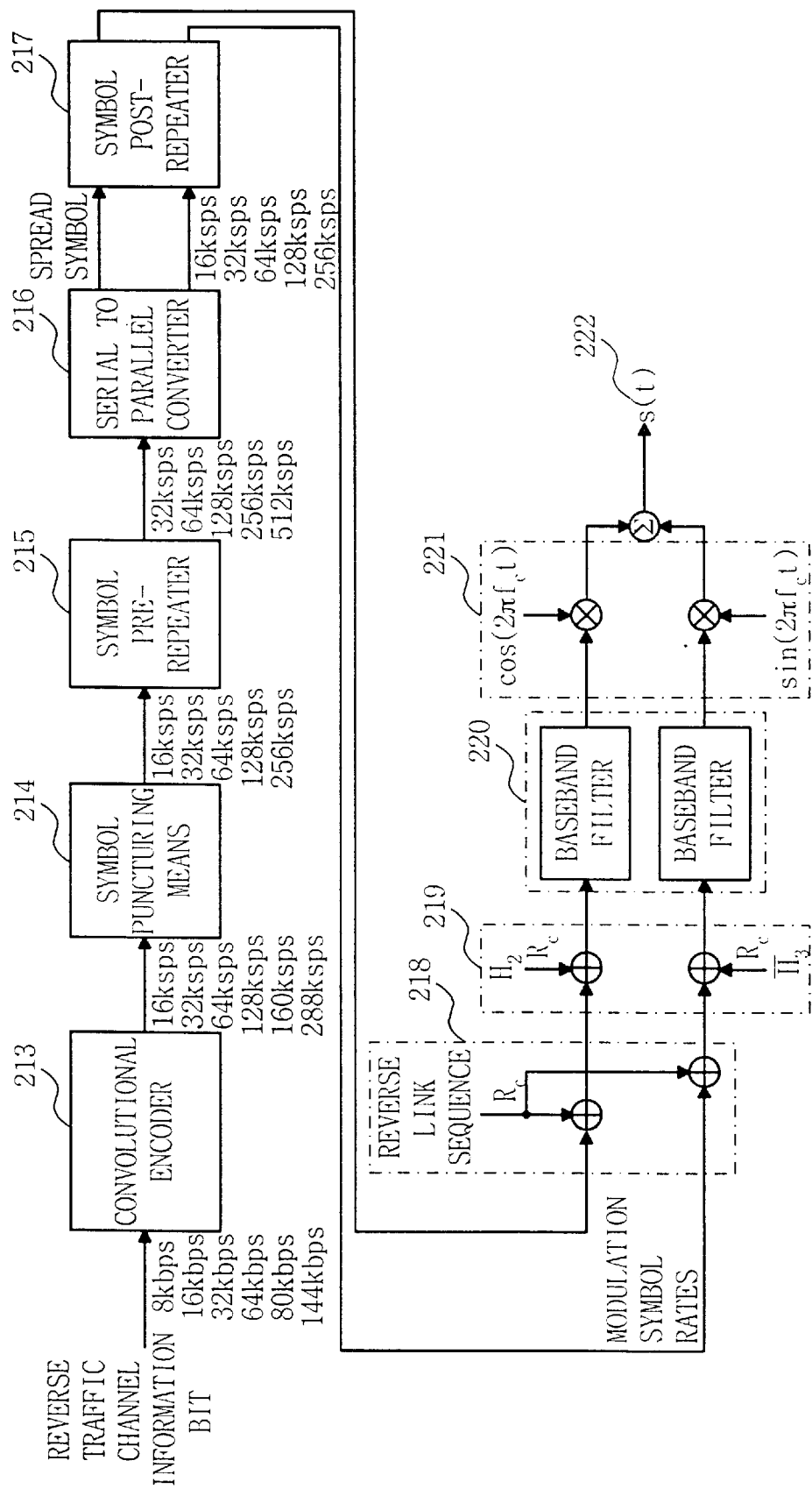
Figure 3A:
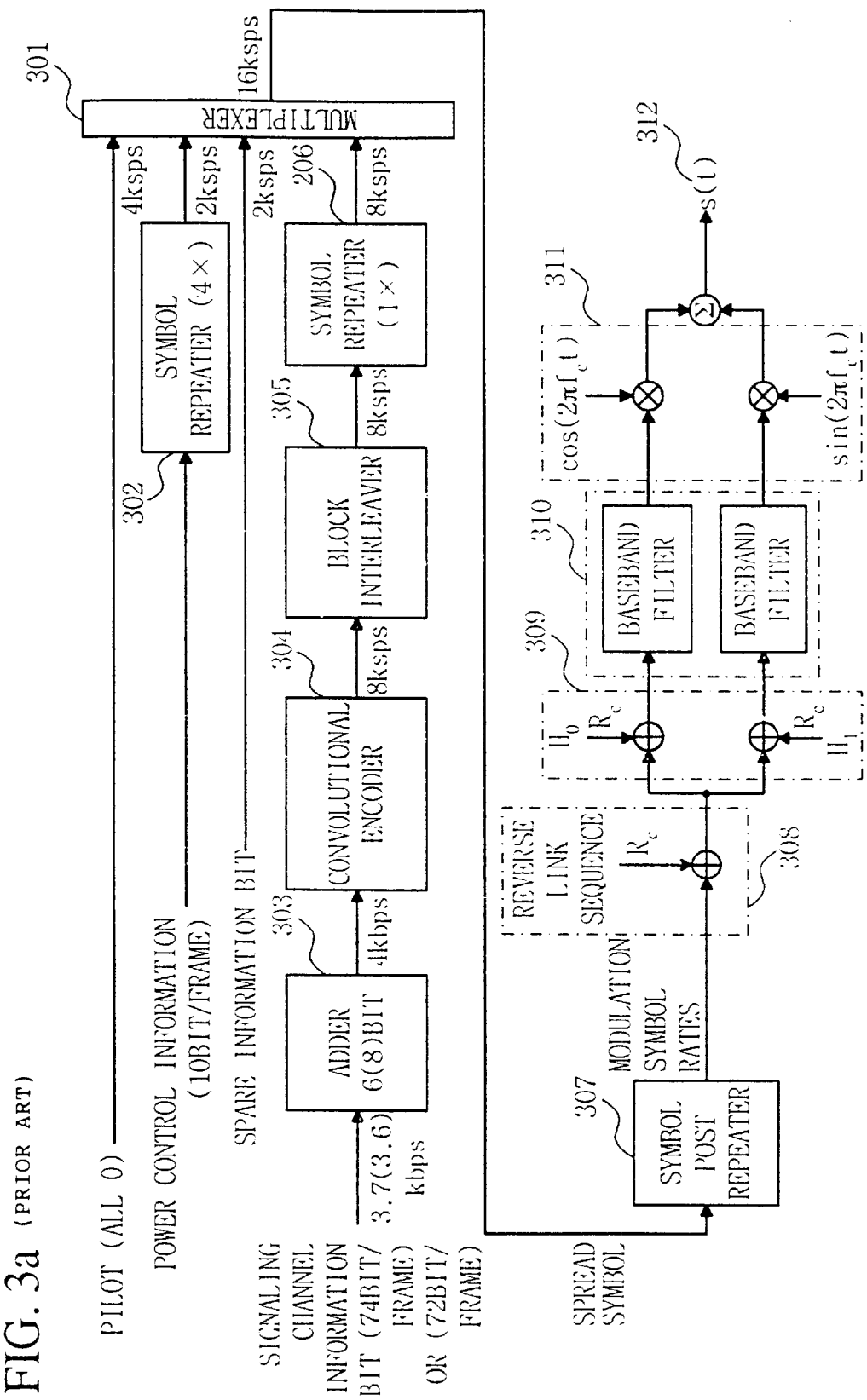
FIGS. 3a–3c illustrate a channel structure of a reverse traffic channel of a multiple signal mode in a conventional wideband code division multiple access system.
Figure 3B:
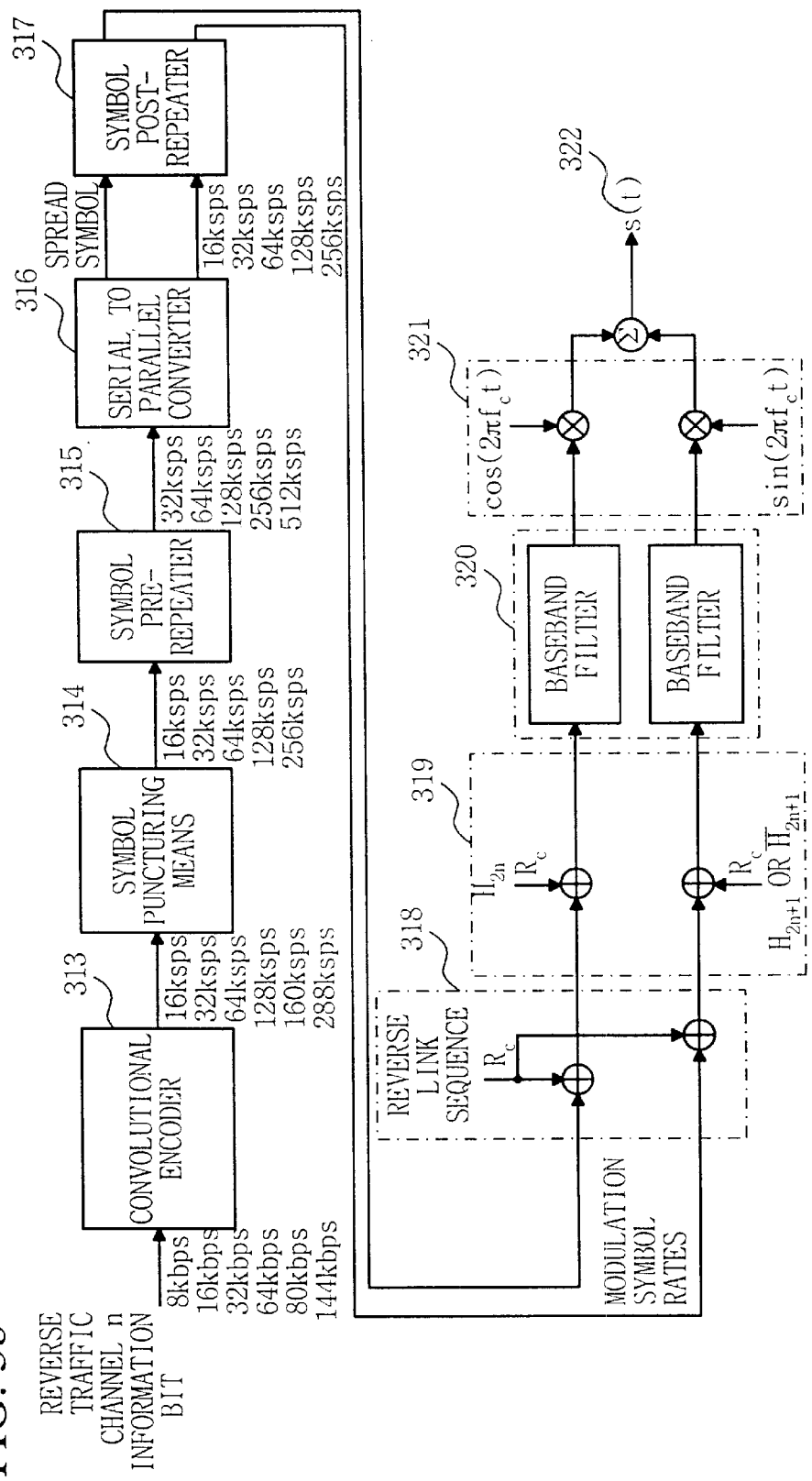
Figure 3C:
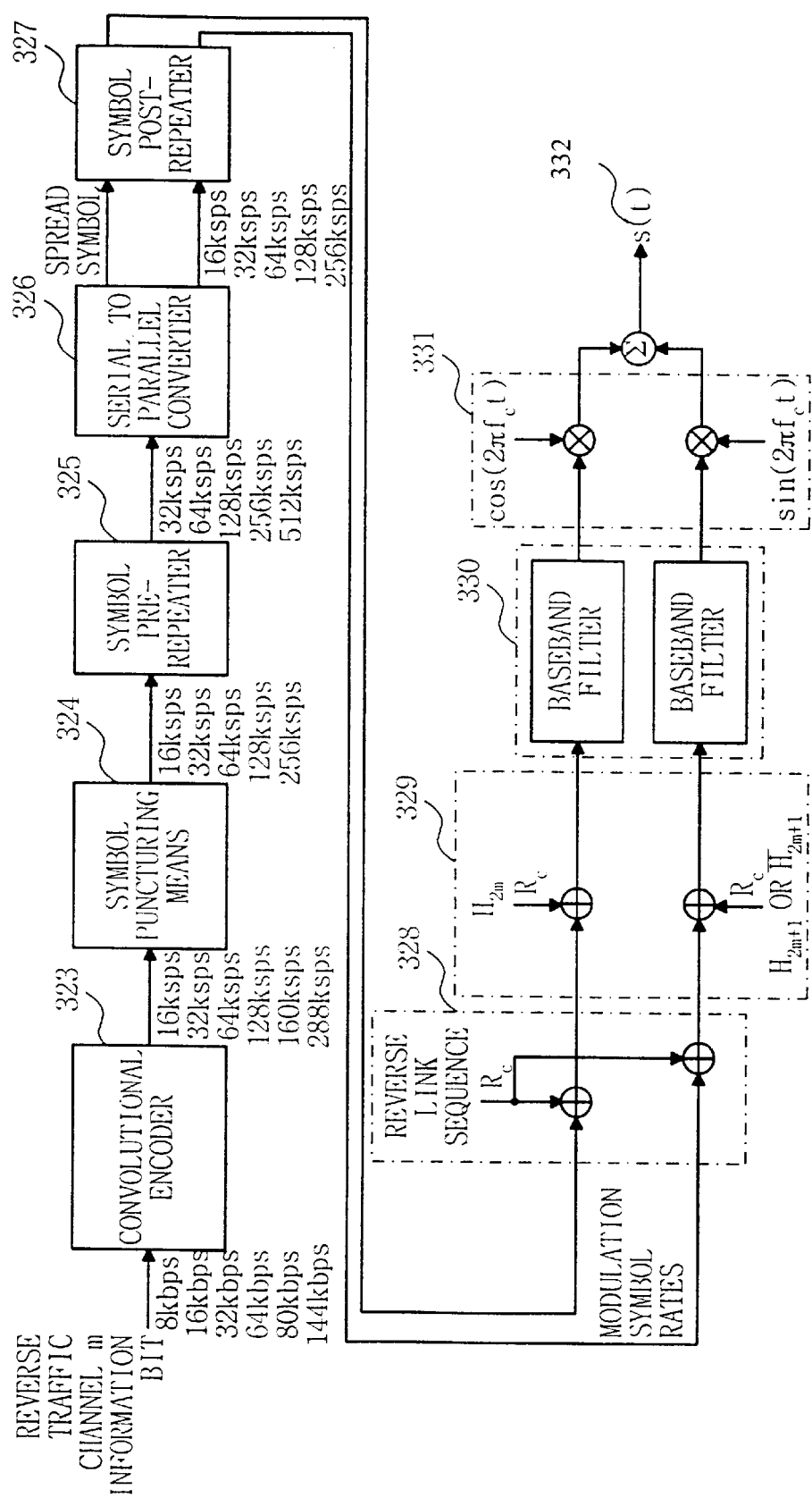
Figure 4A:
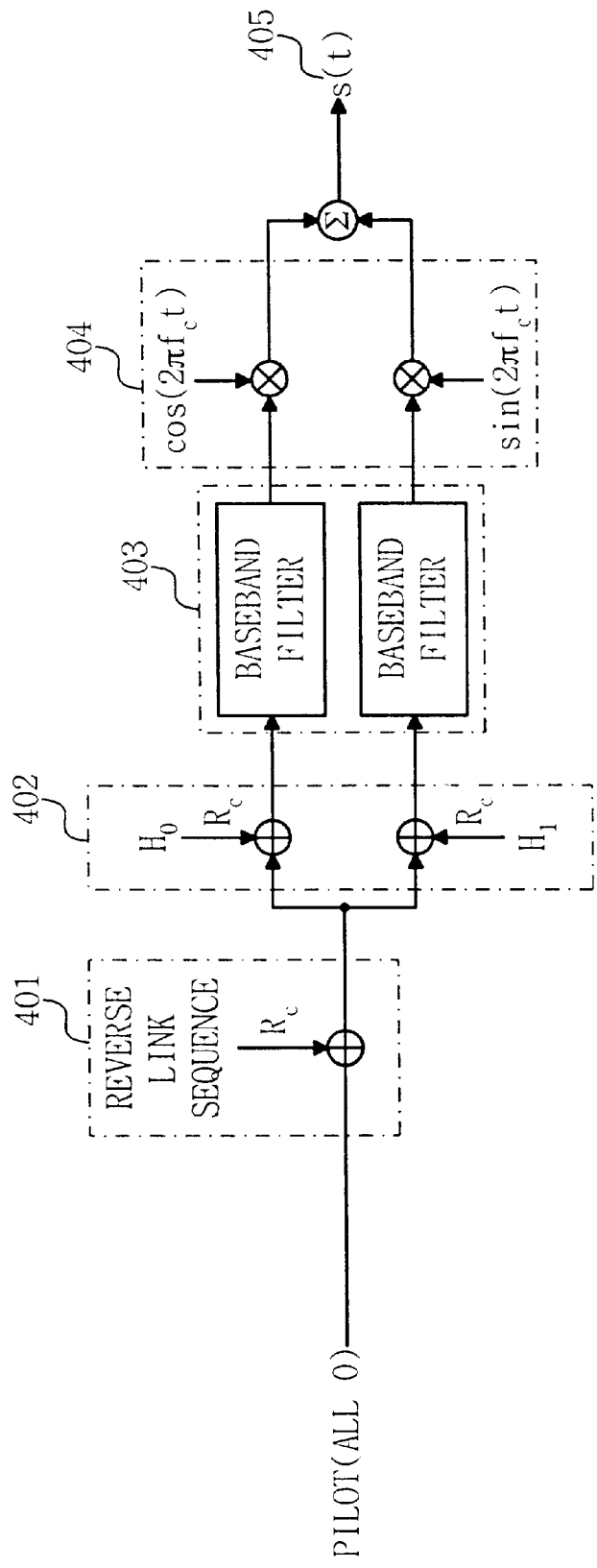
FIGS. 4a and 4b illustrate a channel structure of a packet access channel in a conventional wideband code division multiple access system.
Figure 4B:
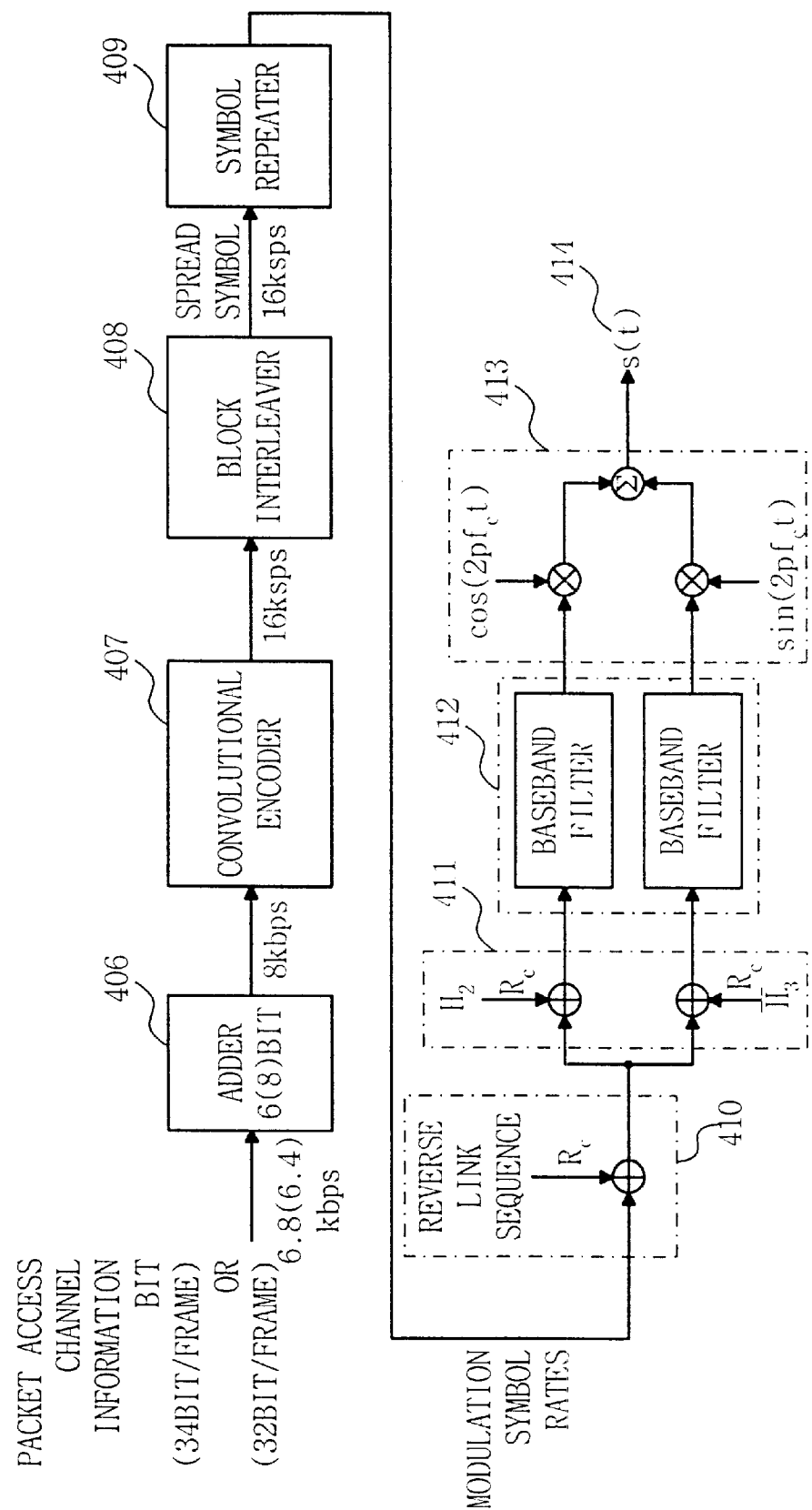
Figure 5A:
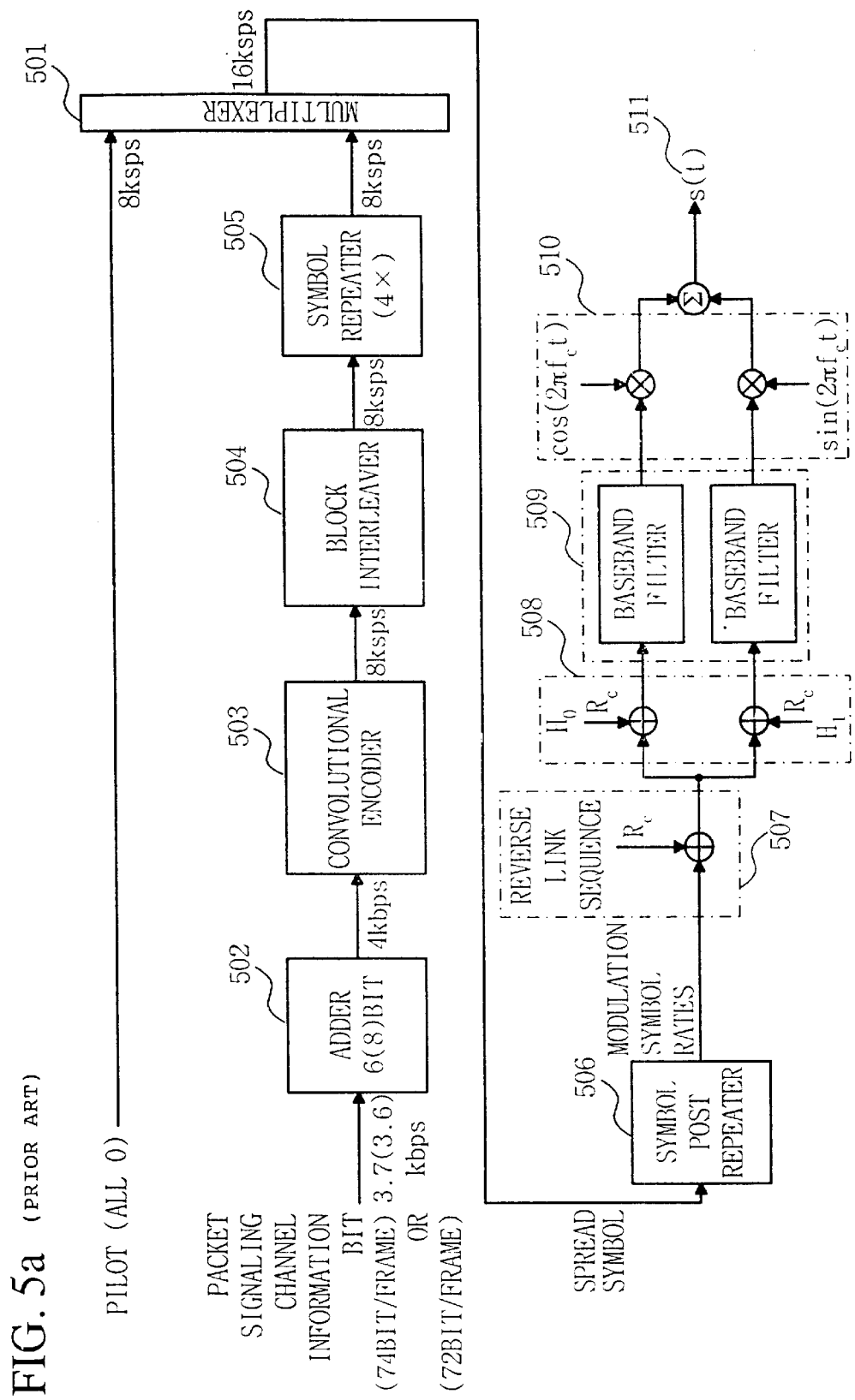
FIGS. 5a and 5b illustrate a channel structure of a reverse packet traffic channel of a single signal mode in a conventional wideband code division multiple access system.
Figure 5B:
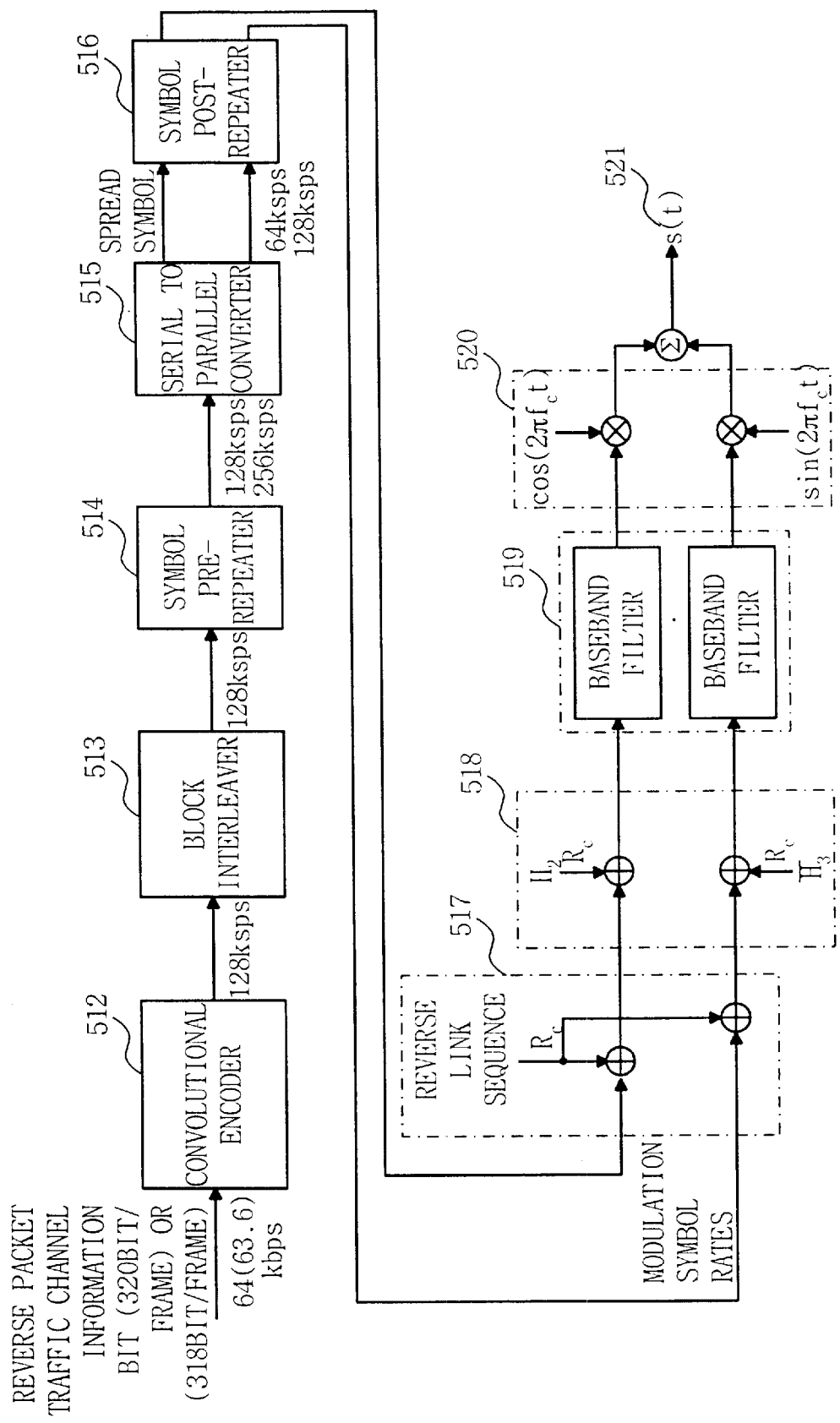
Figure 6A:
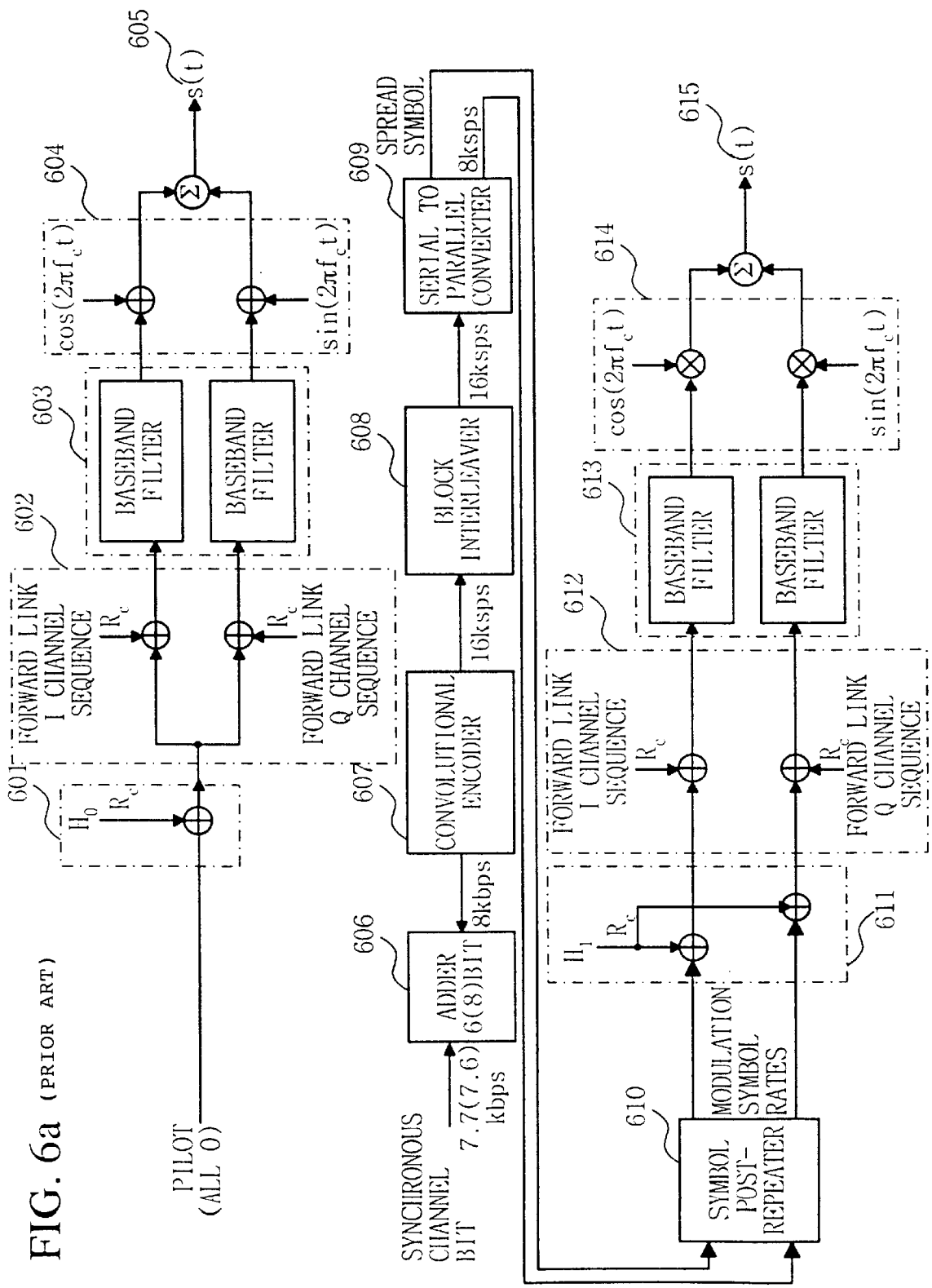
FIGS. 6a–6e illustrate a channel structure of a forward channel in a conventional wideband code division multiple access system.
Figure 6B:
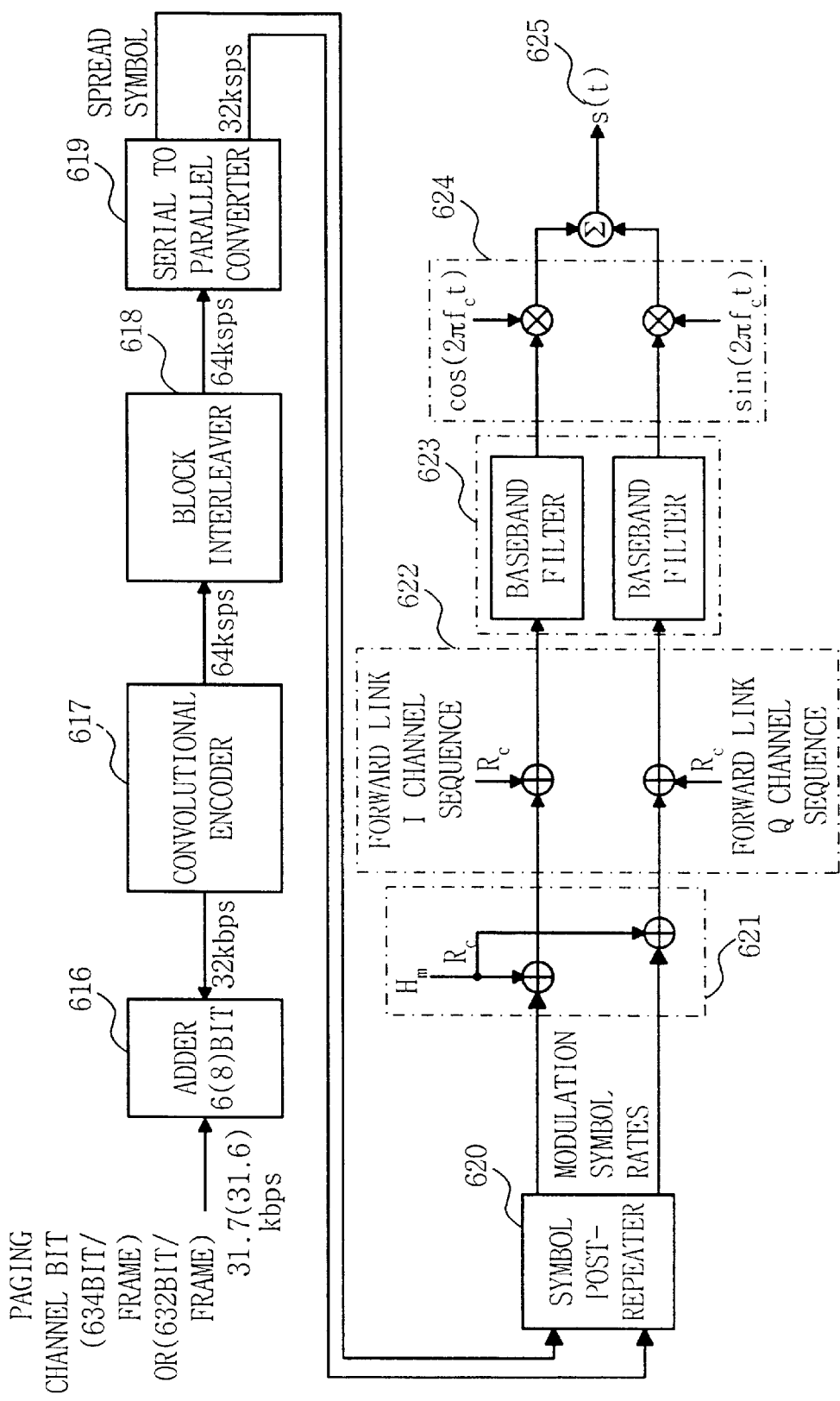
Figure 6C:
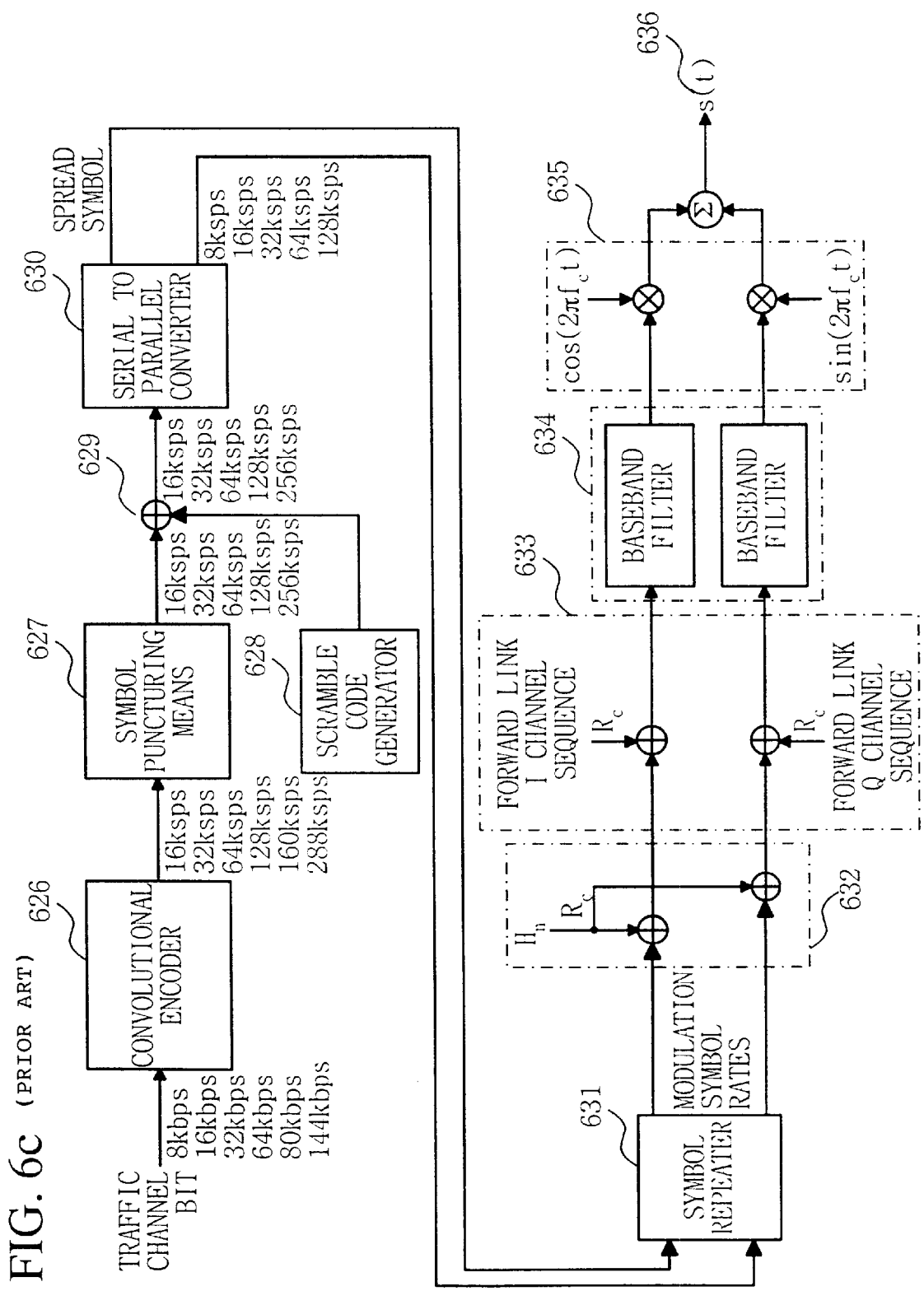
Figure 6D:
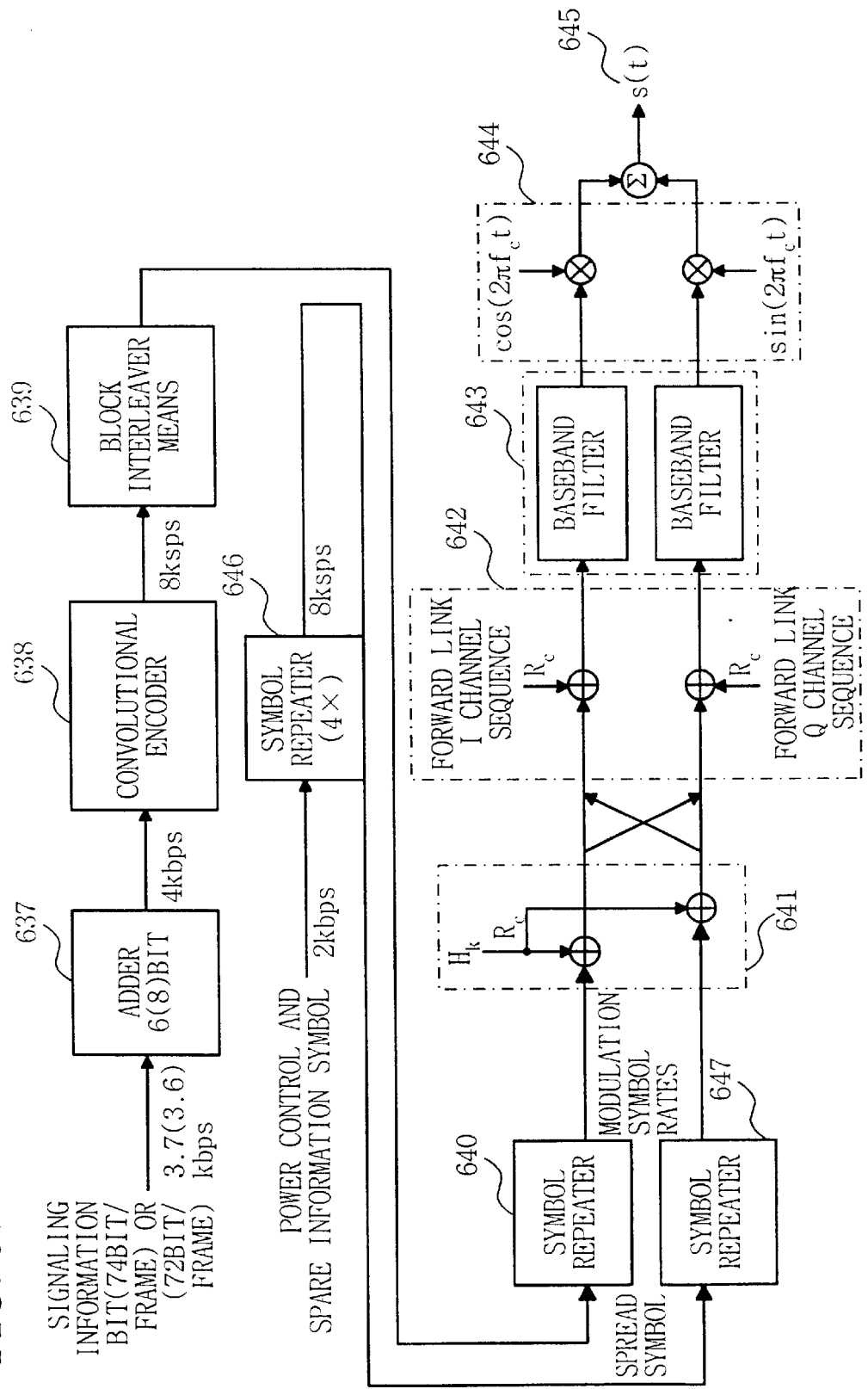
Figure 6E:
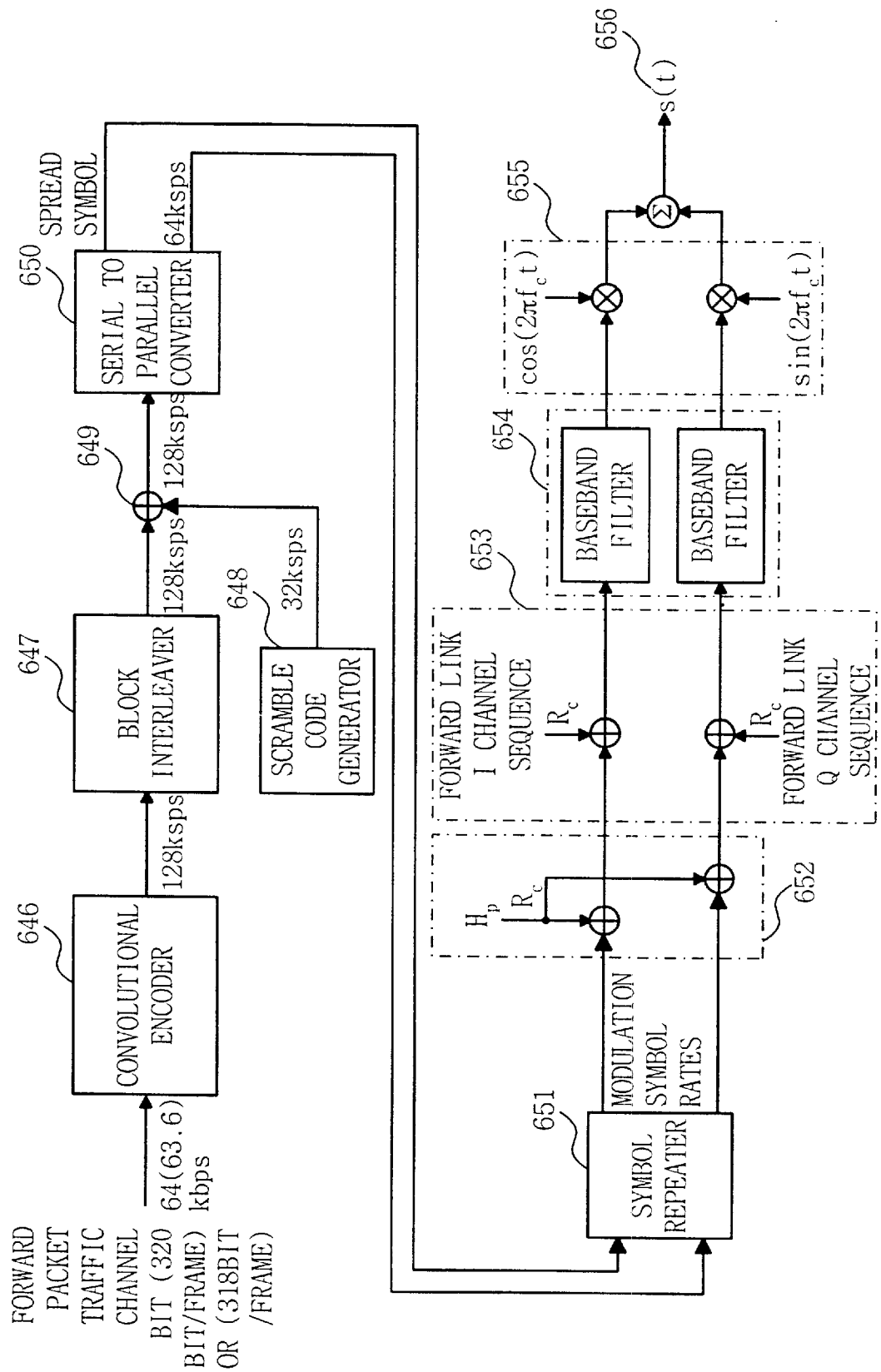

Similar to the illustration discussed above regarding FIGS. 2*a* and 2*b*, the signal transferred from a reverse/PPCS channel is an output signal of a symbol repeater for a power control channel and an output signal of the adder, convolutional encoder, and block interleaving means, and symbol repeater for a signaling channel.

A signal from the reverse/PPCS channel 710 is multiplied by a signal of a PCS register 701. The PCS register 710 outputs 0 or 1 for operating with a pilot channel and with a PPCS channel respectively.

The output signal of a AND gate (720) is connected 0 input port of an I and Q multiplexer 740, 745.

The I and Q signals, before executing a spreading in a forward/PCS channel 730, is transferred to the 1 input port of an I and Q multiplexer.

Similar to the illustration discussed above regarding FIGS. 6*a*–6*e*, a signal inputted to the multiplexers 740, 745 for the forward/PCS channel 730 is a signal passed by an adder and a convolutional encoder, while a signal passed by a symbol repeater for a signaling channel and a power control/spare channel, respectively.

A selection port of the I and Q multiplexer 740, 750 is connected to a forward/reverse selection signal (702= Forward/Reverse=1/0).

The forward/reverse selection signal outputs 1 or 0 for a forward and reverse respectively. The outputs of the I and Q multiplexer 740, 745 are connected to the symbol repeater 750. The symbol repeater iterates data with different iteration rates for the forward and reverse, and then generates a constant symbol rate.

The symbol iterated signal is executed by a spreading and modulated to BPSK modulation or QPSK modulation for operating with a reverse channel and a forward channel respectively.

A signal passed by the symbol repeater 750 is spread by a Hadamard code. By using a Hadamard multiplexer, the first Hadamard code $H_I$ is multiplied by the I signal and then transferred to a 1 input port of the Hadamard multiplexer.

The second Hadamard code $H_Q$ is transferred to a 0 input port of the Hadamard multiplexer. A selection port of the Hadamard multiplexer is connected to a forward/reverse selection signal 702 and the output of the Hadamard multiplexer is multiplied by the Q signal.

As a result of the Hadamard multiplexer design, the I and Q signals are spread by the first and second Hadamard codes for operating with a reverse channel, respectively.

In addition, for operating with a forward channel, the I and Q signals are spread by the first Hadarnard code.

The Hadamard spread I and Q signals are connected to a I/Q exchanger 770. The I/Q exchanger exchanges the I and Q signals each other if the present channel is operating with a forward and an I/Q exchange selection signal is 1.

A drive terminal of the I/Q exchanger is connected to a AND gate 775 and the AND gate drive the I/Q exchanger by outputting 1 only when the forward/reverse selection signal (702) is 1 and the I/Q exchange selection signal is 1.

The exchanged I and Q signals are connected to a PN spreading means. A PN code for spreading is selected by the PN multiplexer 780. The first PN code ($PN_I$) is directly multiplied to the I signal and then transferred to 0 input port of the PN multiplexer.

The second PN code ($PN_Q$) is transferred to 1 input port. A selection port of the PN multiplexer is connected to the forward/reverse selection signal (702) and the output is multiplied to the Q signal.

As a result, for operating with a reverse channel, the I and Q signals are spread by the first PN code. Moreover, for operating with a forward channel, the I and Q signals are spread by the first and the second PN codes, respectively.

The PN spreaded I and Q signals are finally to be a transmission signal s(t) carried by a carrier wave $f_c$ after passing a baseband filter.

As illustrated above, the present invention can use flexibly a modulator between base station and radio terminal by adapting a BPSK/QPSK modulation method in accordance with the PCS register 710 and the forward/reverse selection signal 702.

Figure 8:
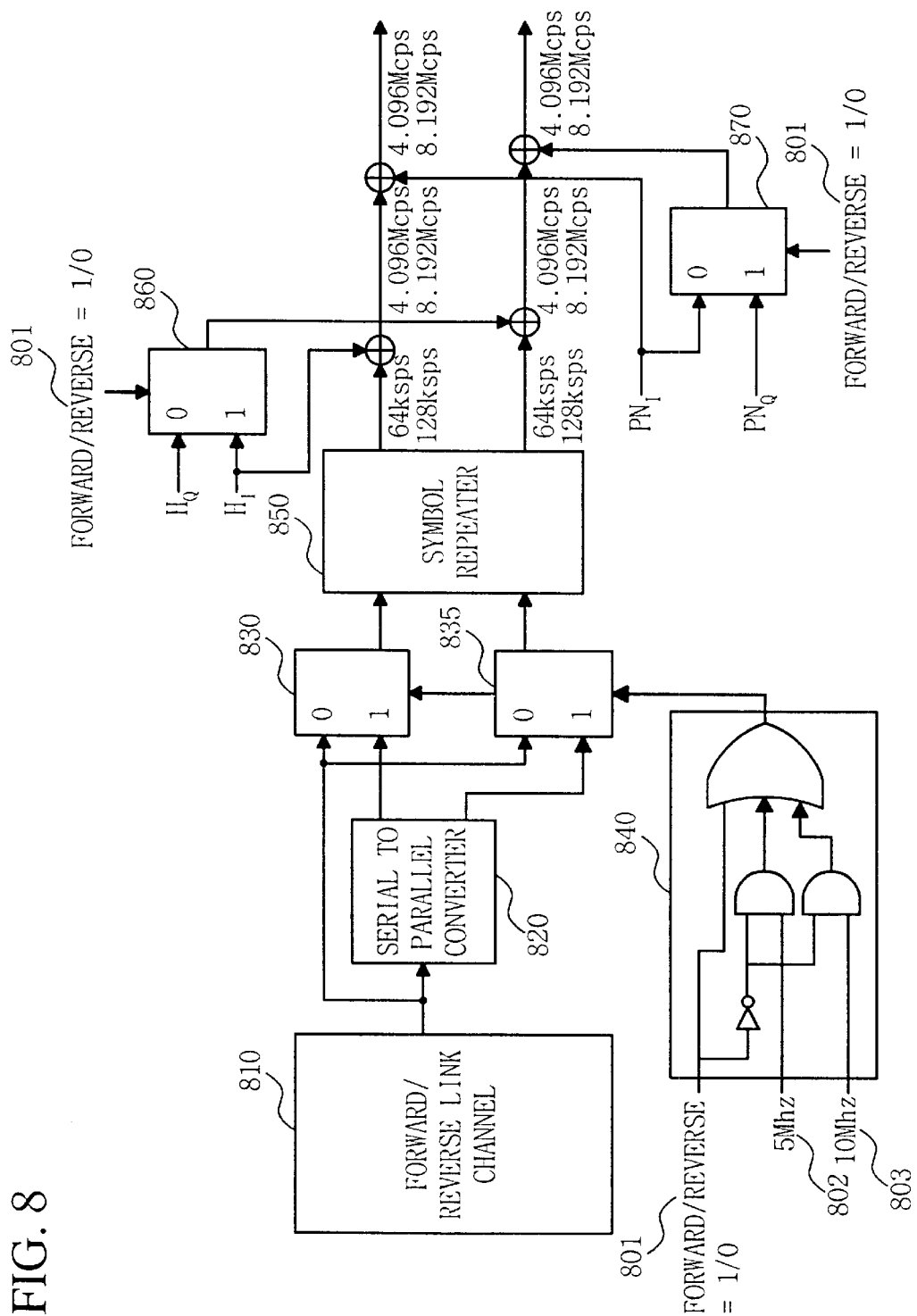
FIG. 8 illustrates a traffic channel structure of the present invention.

FIG. 8 illustrates a channel structure of the traffic channel of the present invention. This channel structure has a modulator for the traffic channel, and synchronous/paging/access channels having a similar structure can be included.

A signal output from a forward/reverse link channel 810 is an output signal before executing a spreading in each channel. The signal is an output signal after passing through an adder, convolutional encoder, and block interleaving means (not shown in FIG. 8) for the access/synchronous/paging channel. For a reverse link channel, the signal is an output signal after passing a convolutional encoder, a symbol puncturing means and a symbol repeater. In addition, the signal is an output signal after passing a convolutional encoder, and a symbol puncturing means and a scramble PN spreader for a forward traffic channel.

A signal from the forward/reverse link channel 810 is transferred to a serial to parallel converter 820 and 0 input ports of the I and Q multiplexers (830, 835).

The serial to parallel converter converts input signal to a two bit parallel signal and then outputs the two bit parallel signal to input ports 1 of both the I and Q multiplexers (830, 835).

A signal inputted directly to the 0 input ports of the I and Q multiplexers is a signal to be modulated by BPSK modulation, and a signal inputted to 1 input ports of the I and Q multiplexers, via the serial to parallel converter, is a signal to be modulated by QPSK modulation.

The outputs of the I and Q multiplexer are selected by a forward/reverse selection signal and a bandwidth/transfer rates signal.

According to the International standards, in a system having a transfer rate of under 32 kbps and under 80 kbps for a bandwidth of 5 Mhz and 10 Mhz, respectively, a reverse channel should adapt a BPSK modulation method.

So, 5 Mhz and 10 Mhz selection signals (802, 803) need to be 0 for a transfer rate of under 32 kbps in 5 Mhz bandwidth and at a transfer rate of under 80 kbps in a 10 Mhz bandwidth.

A selector 840 connected to a selection signal of the I and Q multiplexer outputs 0 only when the forward/reverse selection signal 801, the 5 Mhz selection signal 802, and the 10 Mhz selection signal are all 0.

So, only when the I and Q multiplexer have a reverse channel and a transfer rates where the reverse channel is under 32 kbps (or under 80 kbps) for a bandwidth of 5 Mhz (or 10 Mhz, respectively), the signal of the forward/reverse link channel 810 is selected.

Therefore, the QPSK modulation method is always used in a forward link, but another modulation method is used in accordance with the bandwidth and the transfer rates in a reverse link.

Each I and Q signal outputted from the I and Q multiplexer is connected to a symbol repeater 850. The symbol repeater generates a constant symbol rate by iterating data with a different iteration rates for a forward and a reverse link.

The symbol iterated signal is modulated to BPSK or QPSK modulation after executing the iteration. A signal passed by the symbol repeater 850 is spread by a Hadamard code.

The first Hadamard code $H_I$ is directly multiplied by the I signal and simultaneously transferred to 1 input port of a Hadamard multiplexer 860.

The second Hadamard code $H_Q$ is transferred to 0 input port of the Hadamard multiplexer. A selection port of the Hadamard multiplexer 860 is connected to a forward/reverse selection signal 801 and the output is multiplied to the Q signal.

Therefore, in case of operating with a reverse channel, the I and Q signals are spread by the first and second Hadamard code, respectively.

In the case of operating with a forward channel, the I and Q signals are spread by the first Hadamard code.

The Hadamard spread I and Q signals are connected to the PN spreader. The first PN code $PN_I$ is directly multiplied to the I signal and is simultaneously transferred to 0 input port of the PN multiplexer 870.

The second PN code $PN_Q$ is transferred to 1 input port of the PN multiplexer 870. A selection port of the PN multiplexer is connected to a forward/reverse selection signal 801 and the output is multiplied to the Q signal.

Therefore, in case of operating with the reverse channel, the I and Q signal are spread by the first PN code, and in case of operating with the forward channel, the I and Q signal is spread by the first and second PN code, respectively.

The PN spread I and Q signal are finally output as a transmission signal s(t) carried by a carrier wave $f_c$ after passing a baseband filter.

As illustrated in the above embodiment, the present invention uses a multiplexer for receiving a signal of the PCS registor and a forward/reverse selection signal at the selection port and provides a flexible BSPK/QPSK modulator for the forward and reverse channel.

The channel structure of the FIG. 7 can be commonly connected to more than one forward/PCS and reverse/PPCS channel, and can be automatically operated in accordance with a PCS register and a forward/reverse selection signal.

And the channel structure of the FIG. 8 can be commonly connected to more than one forward/reverse traffic PCS channels, and can be automatically operated in accordance with a forward/reverse selection signal and a bandwidth selection signal.

The channel structure of the FIG. 8 can be connected to the synchronous channel, the paging channel and the access channel.

Accordingly, the present invention can diminish the amount of used hardware by controlling a similar parts of the channel in a wideband code division multiple access system, especially BPSK/QPSK modulation parts, by an external register and designing a flexible channel structure for permit control between channels.

Since it is possible to use a minimum number of gates, power consumption can be decreased, and the reliability of an ASIC can be improved when a modulator is composed by the ASIC.

What is claimed is:

1. A flexible modulator for binary phase shift keying and quadrature phase shift keying in a wideband code division multiple access system, said modulator comprising:

a first link selecting means for selecting a modulating type after receiving a signal of a reverse channel or an I (In-phase) signal and Q (quadrature) signal of a forward channel for which a spread modulation is to be executed;

a Hadamard spreading means for a Hadamard code spreading modulation after receiving said I and Q signals from said first link selecting means;

an exchanging means for exchanging signal paths of said I and Q signals spread by said Hadamard spreading means when an exchange for said forward signal is needed; and, a pseudo-noise (PN) spreading means for executing a spread modulation for a pseudo-noise (PN) code of said exchanged I and Q signals.

2. The flexible modulator as set forth in claim 1, wherein said first link selecting means receives a signal to be spread out of a reverse pilot power control signaling (PPCS) channel.

3. The flexible modulator as set forth in claim 1, wherein said first link selecting means receives said I and Q signals to be spread out of a forward power control signaling (PCS) channel.

4. The modulator as set forth in claim 1, wherein said first link selecting means comprises:

an I multiplexer for selecting a reverse I signal when a channel operating mode is a reverse channel mode and for selecting a forward Q signal when the channel operating mode is a forward channel mode;

a Q multiplexer for selecting a reverse I signal when a channel operating mode is a reverse channel mode and for selecting a forward Q signal when the channel operating mode is a forward channel mode; and, a symbol repeater for executing a symbol iteration for said I signal received from said I multiplexer and said Q signal received from said Q multiplexer.

5. The modulator as set forth in claim 4, wherein an iteration rule of said symbol repeater is determined by a channel bandwidth and a type of channel.

6. The modulator as set forth in claim 1, wherein said Hadamard spreading means comprising:
- an I Hadamard spreader for spreading said reverse or said forward I signal by a first Hadamard code; and
- a Q Hadamard spreader for spreading said reverse Q signal by a second Hadamard code and said forward Q signal by said first Hadamard code.

7. The modulator as set forth in claim 1, wherein the pseudo-noise (PN) code spreading means comprises:
- an I PN code spreader for spreading the reverse or forward I signals by a first PN code, and
- a Q PN spreader for spreading the reverse Q signal by said first PN code and the forward Q signal by a second PN code.

8. A flexible modulator for binary phase shift keying and quadrature phase shift keying in a wideband code division multiple access system, said modulator comprising:
- a first link selecting means for selecting a modulating type after receiving a signal of a reverse channel or an I (In-phase) signal and Q (quadrature) signal of a forward channel for which a spread modulation is to be executed;
- a Hadamard spreading means for a Hadamard code spreading modulation after receiving said I and Q signals from said first link selecting means; and,
- a pseudo-noise (PN) spreading means for executing a spread modulation for a pseudo-noise (PN) code of said I signal and said Q signal spread by said Hadamard spreading means.

9. The modulator as set forth in claim 8, wherein said first link selecting means is connected to a forward traffic channel signal to be spread out.

10. The modulator as set forth in claim 8, wherein said first link selecting means is connected to a forward synchronous channel signal to be spread out.

11. The modulator as set forth in claim 8, wherein said first link selecting means is connected to a forward paging channel signal to be spread out.

12. The modulator as set forth in claim 8, wherein said first link selecting means is connected to a reverse traffic channel signal to be spread out.

13. The modulator as set forth in claim 8, wherein said first link selecting means is connected to a reverse access channel signal to be spread out.

14. The modulator as set forth in claim 8, wherein said first link selecting means comprises:
- a serial to parallel converter for converting at least one of said reverse channel and said forward channel signal to be spread out to a 2 parallel bit signal and for transferring to an I multiplexer and a Q multiplexer, respectively;
- said I multiplexer having means for selecting at least one of said reverse channel signal and said forward channel signal to be spread out if a transfer rate is less than under the 32 kbps in a 5 Mhz bandwidth, and 80 kbps in a 10 Mhz bandwidth, respectively, in a reverse operation mode, and means for selecting an output signal of said serial to parallel converter if said transfer rate is greater than said 32 kbps in a 5 MHZ bandwidth and 80 kbps in a 10 MHZ bandwidth;
- a Q multiplexer having means for selecting the reverse or forward channel signal to be spread out, if a transfer rates are less than 32 kbps in a 5 MHZ bandwidth and 80 kbps in a 10 Mhz bandwidth, respectively, in a reverse operation mode, and means for selecting an output signal of the serial to parallel converter if said transfer rate is greater than said 32 kbps in a 5 MHZ bandwidth and 80 kbps in a 10 MHZ bandwidth; and,
- a symbol repeater for executing a symbol iteration for the transferred signals from said I multiplexer and said Q multiplexer.

15. The modulator as set forth in claim 8, wherein said Hadamard spreading means comprises:
- a I Hadamard spreader for spreading said reverse signal or said forward I signal by said first Hadamard code, and
- a Q Hadamard spreader for spreading said reverse Q signal by said second Hadamard code and the forward signal by said first Hadamard code.

16. The modulator as set forth in claim 8, wherein said pseudo-noise (PN) code spreading m means comprises:
- an I pseudo-noise (PN) code spreader for spreading at least one of said reverse signal and said forward I by a first PN code, and
- a Q PN spreader for spreading said reverse Q signal by said first PN code and said forward Q signal by the second PN code.

* * * * *